US012715190B2

(12) United States Patent
Takanashi

(10) Patent No.: US 12,715,190 B2
(45) Date of Patent: Aug. 25, 2026

(54) MANUFACTURING METHOD AND FORMING DEVICE FOR TIRE

(71) Applicant: The Yokohama Rubber Co., LTD., Kanagawa (JP)

(72) Inventor: Yuta Takanashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/548,443

(22) PCT Filed: Nov. 15, 2021

(86) PCT No.: PCT/JP2021/041857
§ 371 (c)(1),
(2) Date: Aug. 30, 2023

(87) PCT Pub. No.: WO2022/185622
PCT Pub. Date: Sep. 9, 2022

(65) Prior Publication Data

US 2024/0190093 A1 Jun. 13, 2024

(30) Foreign Application Priority Data

Mar. 4, 2021 (JP) ................................ 2021-034165

(51) Int. Cl.
*B29D 30/16* (2006.01)
*B29D 30/70* (2006.01)

(52) U.S. Cl.
CPC ......... *B29D 30/1657* (2013.01); *B29D 30/70* (2013.01)

(58) Field of Classification Search
CPC .......... B29D 2030/1692; B29D 30/705; B29D 30/1657; B29D 30/1642; B29D 30/165;
(Continued)

(56) References Cited

U.S. PATENT DOCUMENTS

2011/0240208 A1* 10/2011 Marchini .............. B29D 30/70 156/397
2014/0374008 A1 12/2014 Marchini et al.
(Continued)

FOREIGN PATENT DOCUMENTS

FR 3084279 A1 * 1/2020 ............ B29D 30/42
JP 46-8584 3/1971
(Continued)

*Primary Examiner* — Sedef E Paquette
*Assistant Examiner* — Alexander D Booth
(74) *Attorney, Agent, or Firm* — Thorpe North & Western

(57) ABSTRACT

In a tire manufacturing method, one band-like strip material is sequentially supplied through one strip material supply line. By repeating a step of bonding the strip material placed in an arrangement unit by a holding machine to a forming surface on the outer circumferential side of the rigid core using a bonding mechanism, a belt layer in which the strip materials are arranged in the circumferential direction with reinforcing cords inclined at a predetermined inclination angle with respect to the circumferential direction of the rigid core. The strip material held by the holding machine is turned upside down and placed on the arrangement unit to construct a belt multilayer structure in which the inclination directions of the reinforcing cords of vertically adjacent belt layers are opposite to each other, thereby forming a green tire including the belt multilayer structure.

2 Claims, 23 Drawing Sheets

(58) Field of Classification Search
CPC ........ B29D 2030/1685; B29D 30/3057; B29D 30/305; B29D 30/3042; B29D 2030/3085; B29D 2030/3092; B29D 2030/4487; B29D 2030/2685; B29D 2030/2671
See application file for complete search history.

(56) References Cited

U.S. PATENT DOCUMENTS

| | | | | |
|---|---|---|---|---|
| 2021/0078272 | A1 * | 3/2021 | Takanashi .......... | B29D 30/1657 |
| 2021/0078273 | A1 * | 3/2021 | Leblanc ................ | B29D 30/42 |

FOREIGN PATENT DOCUMENTS

| | | | |
|---|---|---|---|
| JP | 2003-514695 | A | 4/2003 |
| JP | 2004-504953 | A | 2/2004 |
| JP | 2005-528258 | A | 9/2005 |
| JP | 2006-130920 | A | 5/2006 |
| JP | 2012-511451 | A | 5/2012 |
| JP | 2019-142040 | A | 8/2019 |
| NL | 2017820 | B1 * | 5/2018 |
| WO | 99/17920 | A1 | 4/1999 |
| WO | 2002/055289 | A1 | 7/2002 |
| WO | 2009/033493 | A1 | 3/2009 |

* cited by examiner

MANUFACTURING METHOD AND FORMING DEVICE FOR TIRE

TECHNICAL FIELD

The present technology relates to a tire manufacturing method and a tire forming device and particularly relates to a tire manufacturing method and a tire forming device capable of making equipment more compact when forming a belt layer by sequentially arranging and bonding a large number of strip materials to an outer circumference of a rigid core in a circumferential direction and bonding the strip materials that are adjacent to each other in the circumferential direction.

BACKGROUND ART

A method is known in which, in a tire manufacturing process, a rigid core having an outer circumferential surface shape corresponding to a tire inner circumferential surface shape of a completed tire is used. Tire components are sequentially layered on the outer circumference of the rigid core to form a green tire (see, for example, Japan Unexamined Patent Publication No. 2019-142040 A). In the technology of Japan Unexamined Patent Publication No. 2019-142040 A, in order to form a belt layer, a large number of strip materials are used, the strip materials being formed by coating, with an unvulcanized rubber, a plurality of reinforcing cords arranged in parallel with each other. The strip materials are sequentially arranged in the circumferential direction of the rigid core such that the reinforcing cords extend in the width direction of the rigid core at a predetermined inclination angle with respect to the circumferential direction of the rigid core.

A plurality of layered belt layers are generally layered such that the inclination direction of each reinforcing cord with respect to the circumferential direction of the rigid core is in an opposite direction for each layer. Therefore, when a green tire is formed, it is necessary to prepare two types of strip materials in which the inclination directions of the reinforcing cords with respect to the circumferential direction of the rigid core are opposite to each other. If supply lines for supplying the two types of strip materials to the rigid core are individually provided, there is a problem of equipment becoming large.

SUMMARY

The present technology provides a tire manufacturing method and a tire forming device capable of making equipment more compact when forming a belt layer by bonding strip materials adjacent to each other in a circumferential direction on a forming surface positioned on an outer circumferential side of a rigid core.

A tire manufacturing method according to an embodiment of the present technology includes:

- sequentially arranging and bonding one band-like strip material including a plurality of reinforcing cords arranged in parallel with each other and coated with an unvulcanized rubber to a forming surface located on an outer circumferential side of a rigid core in a circumferential direction of the rigid core such that the reinforcing cords are extended in an oblique direction at a predetermined inclination angle with respect to the circumferential direction, thereby forming a belt layer in which the strip materials that are bonded adjacent to each other in the circumferential direction are bonded;

- constructing a belt multilayer structure by layering a plurality of the belt layers in which the reinforcing cords of the belt layers vertically adjacent to each other have opposite inclination directions with respect to the circumferential direction;
- forming a green tire having the belt multilayer structure; and
- vulcanizing the green tire,
- the method comprising:
- when constructing the belt multilayer structure, forming each of the belt layers by repeatedly performing a step of holding, by a holding machine, the one strip material supplied through one strip material supply line, moving and placing the strip material into an arrangement unit, and bonding the strip material placed in the arrangement unit to the forming surface, in which the strip material held by the holding machine is turned upside down and placed in the arrangement unit so that the inclination directions of the reinforcing cords of the belt layers vertically adjacent to each other are opposite to each other.

A tire forming device according to an aspect of the present technology includes: an arrangement unit in which one band-like strip material including a plurality of reinforcing cords arranged in parallel with each other and covered with an unvulcanized rubber is placed; and

- a bonding mechanism that relatively moves at least one of a rigid core and the arrangement unit with respect to the other, the tire forming device being configured such that
- the bonding mechanism relatively moves at least one of the rigid core and the arrangement unit,
- the one strip material placed in the arrangement unit is sequentially arranged and bonded to a forming surface located on an outer circumferential side of the rigid core in a circumferential direction of the rigid core such that the reinforcing cords are extended in an oblique direction at a predetermined inclination angle with respect to the circumferential direction,
- the strip materials that are bonded adjacent to each other in the circumferential direction are bonded to form a belt layer, and
- a belt multilayer structure is constructed by layering a plurality of the belt layers in which the reinforcing cords of the belt layers vertically adjacent to each other have opposite inclination directions with respect to the circumferential direction,
- the tire forming device comprising:
- one strip material supply line that sequentially supplies the one strip material; and
- a holding machine that holds the strip material that is supplied and moves and places the strip material into the arrangement unit,
- the holding machine comprising a turning mechanism that turns upside down the strip material that is held, and when reversing the inclination directions of the reinforcing cords of the belt layers vertically adjacent to each other, the strip material held by the holding machine being turned upside down and placed in the arrangement unit.

According to the present technology, a strip material can be turned upside down and placed in an arrangement unit by a holding machine that holds a strip material that is sequentially supplied. Therefore, in order to form a belt layer by sequentially arranging and bonding a large number of strip materials to the outer circumference of the rigid core in the circumferential direction and to construct a belt multilayer structure in which the inclination directions of the reinforcing cords of vertically adjacent belt layers are opposite to each other, one strip material supply line for sequentially supplying one strip material may be provided. That is, it is not necessary to separately provide supply lines for supplying two types of strip materials in which the inclination directions of the reinforcing cords are opposite to each other. Accordingly, the equipment for constructing the belt multilayer structure can be made more compact, so that a wide installation space for the equipment is not required, which contributes to a reduction in equipment cost.

DETAILED DESCRIPTION

A tire manufacturing method and a tire forming device according to embodiments of the present technology will be described below with reference to the drawings.

Figure 1:
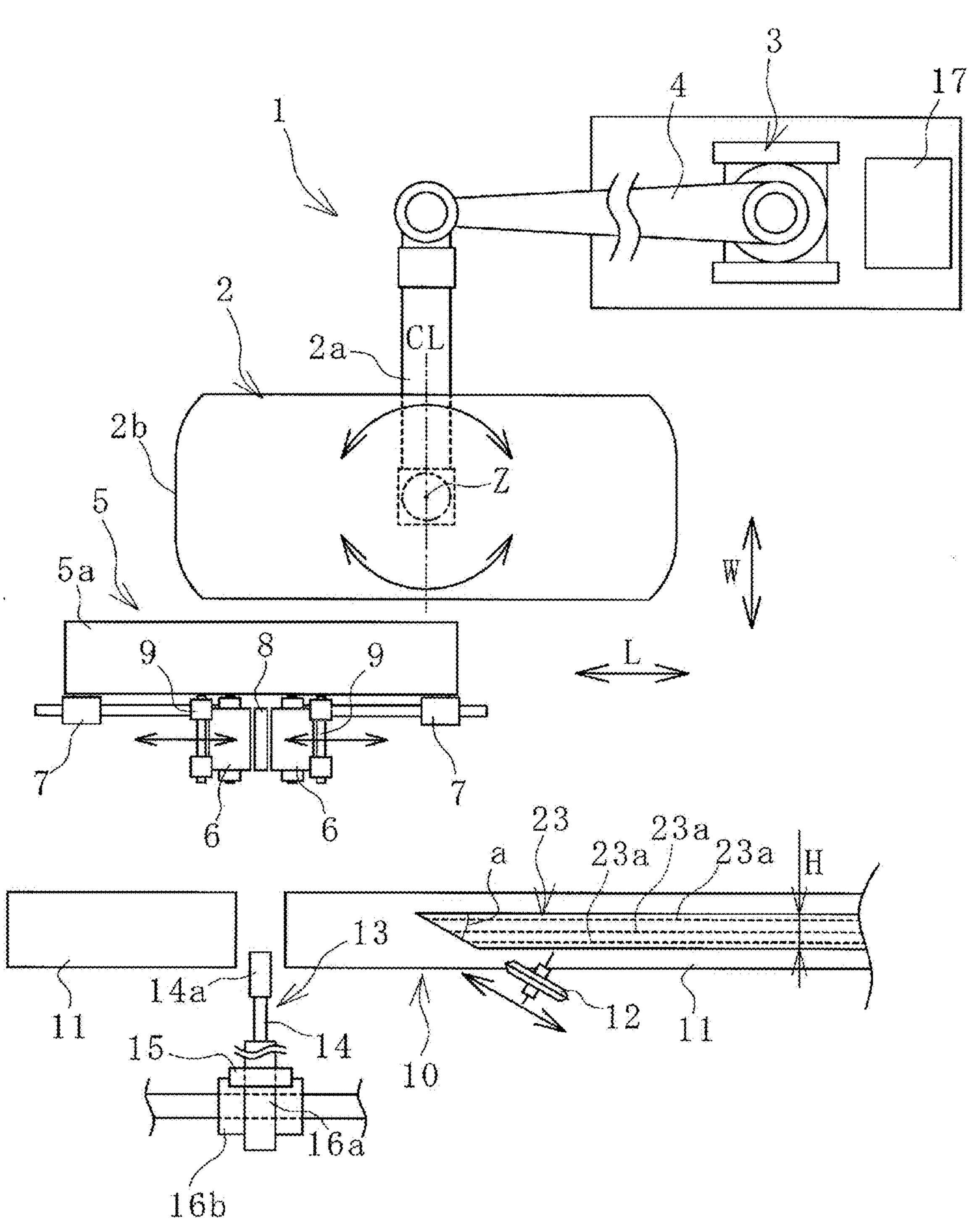
FIG. 1 is an explanatory diagram illustrating a tire forming device according to the present technology in a plan view.
Figure 2:
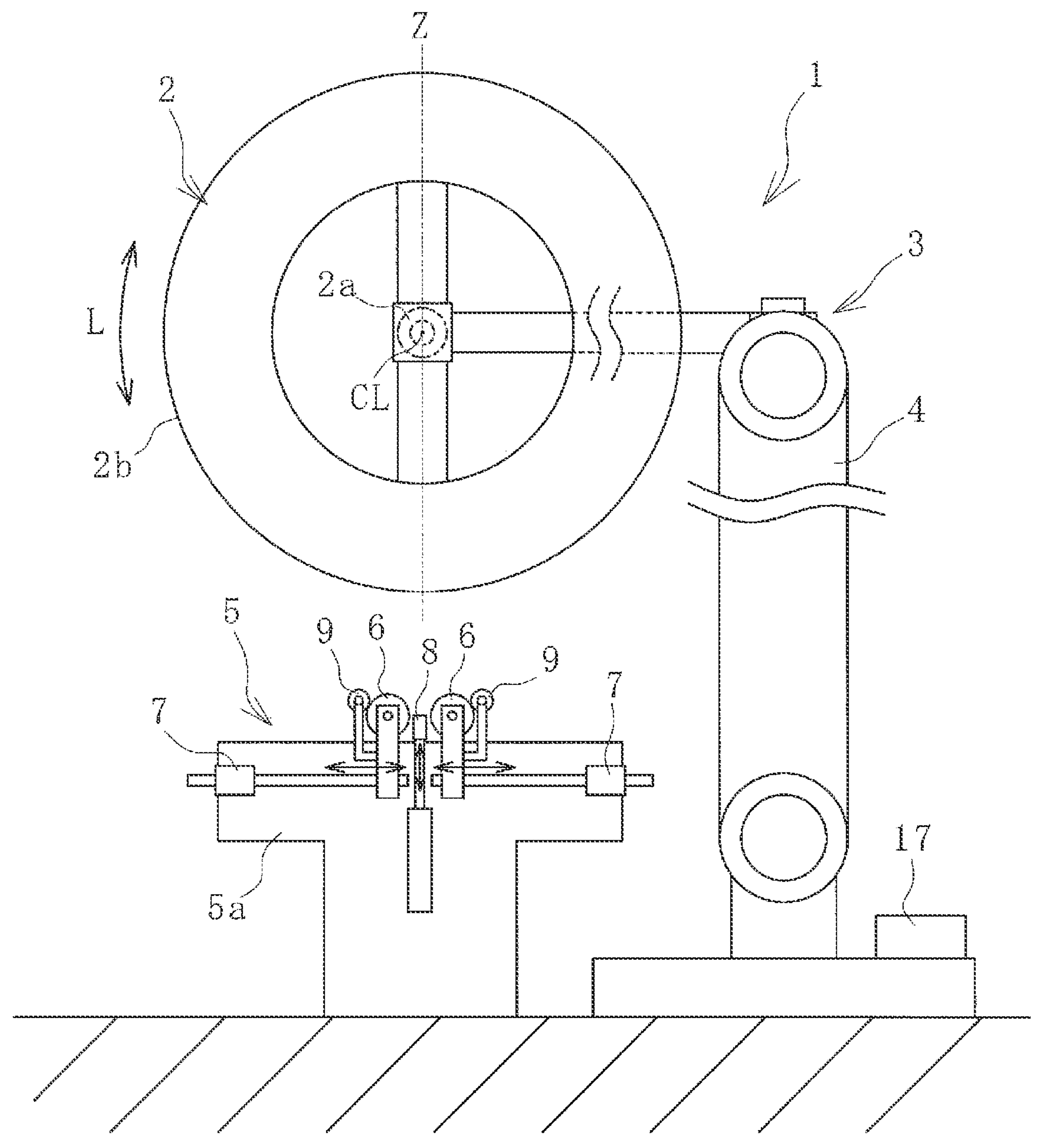
FIG. 2 is an explanatory diagram illustrating a part of the forming device in FIG. 1 in a front view.
Figure 3:
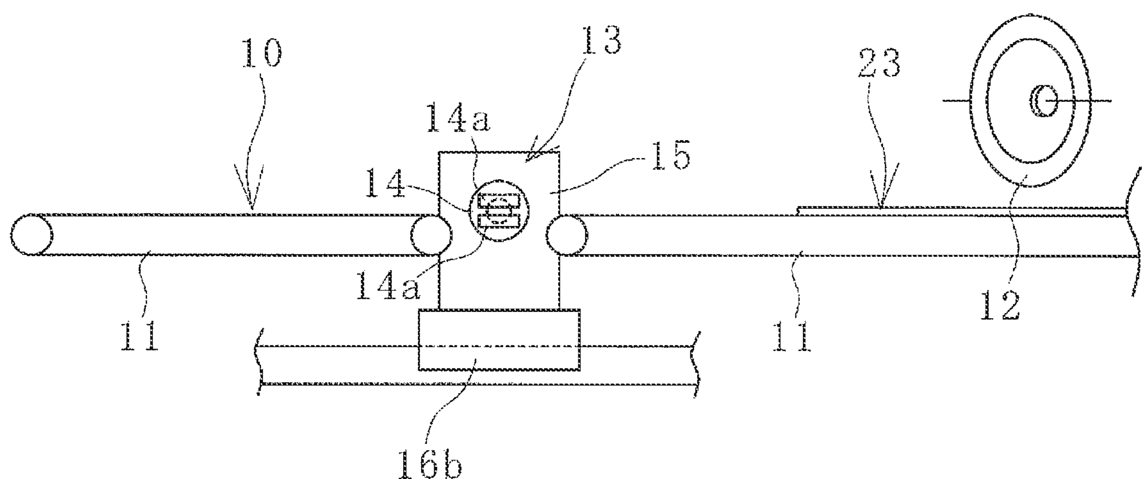
FIG. 3 is an explanatory diagram illustrating the vicinity of the holding machine and the strip material supply line of FIG. 1 in a front view from the arrangement unit side.

In a tire manufacturing method according to an embodiment of the present technology, a green tire G is formed using a tire forming device 1 according to an embodiment of the present technology illustrated in FIGS. 1 to 3, and the formed green tire G is vulcanized to manufacture a tire T. Note that the present technology is not limited to general pneumatic tires and can be applied to the manufacturing of various tires T such as solid tires.

Figure 4:
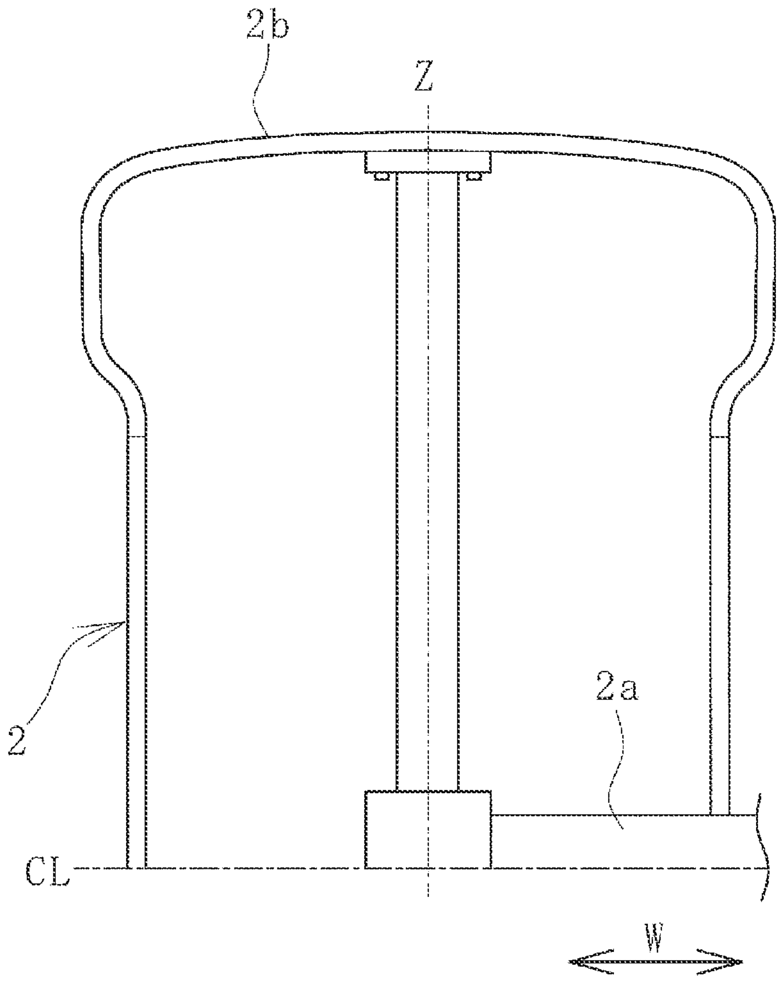
FIG. 4 is an explanatory diagram illustrating an upper half of the rigid core in FIG. 1 in a cross-sectional view.

For forming the green tire G, a rigid core 2 formed of metal or the like and illustrated in FIG. 4 is used. The rigid core 2 has an outer circumferential surface shape corresponding to a tire inner circumferential surface shape of the completed tire T. Therefore, an outer circumferential surface 2*b* of the rigid core 2 has a profile in which the circumferential length changes depending on a position in the width direction of the rigid core 2. In general, the profile is such that the central portion in the width direction of the rigid core 2 protrudes more to the outer circumferential side than both end portions. The rigid core 2 is constituted of, for example, a plurality of segments divided in the circumferential direction about a center shaft 2*a* and a support rod supporting the inner side of the segments.

Note that a width direction W and a circumferential direction L of the rigid core 2 correspond to the width direction and the circumferential direction of the green tire G and the completed tire T, respectively. A dot-dash line CL in the drawing indicates a tire axis (axial center of the center shaft 2*a*), and a dot-dash line Z indicates a turning axis which is orthogonal to the dot-dash line CL and passes through the center of the rigid core 2 in the width direction W.

The forming device 1 includes an arrangement unit 5 in which one band-like strip material 23 is placed, a bonding mechanism 3 that relatively moves at least one of the rigid core 2 and the arrangement unit 5 with respect to the other, one strip material supply line 10 that sequentially supplies one strip material 23, a holding machine 13 that holds each supplied strip material 23 and moves and places it into the arrangement unit 5, and a control unit 17. Operations of the bonding mechanism 3, the arrangement unit 5, the strip material supply line 10, and the holding machine 13 are controlled by the control unit 17. A computer is used as the control unit 17. The number of control units 17 is not limited to one, and a plurality of the control units 17 can be provided.

The strip material 23 is formed by covering, with an unvulcanized rubber, a plurality of reinforcing cords 23*a* arranged in parallel with each other. The extension direction of the reinforcing cord 23*a* is the longitudinal direction of the strip material 23. Both ends of the strip material 23 in the longitudinal direction are cut at a predetermined inclination angle a with respect to the longitudinal direction and become parallel to each other (the inclination angle a is an acute angle). A width H of one cut strip material 23 is, for example, 5 mm or more and 50 mm or less, and the length thereof is, for example, 200 mm or more and 800 mm or less. Thus, the strip material 23 is relatively small and light.

The strip material supply line 10 includes a conveying mechanism 11 for moving an elongated body of the strip material 23 in the longitudinal direction and a cutting portion 12 for cutting the elongated body to a predetermined length. As the conveying mechanism 11, abase table or a conveying conveyor which moves forward and backward by a servo motor, a fluid cylinder, or the like can be used. In this embodiment, a round blade is adopted as the cutting portion 12, but various known cutters can be used.

The holding machine 13 includes a holding arm 14, a pair of gripping portions 14*a* disposed at a leading edge portion of the holding arm 14, a turning mechanism 15 for turning the holding arm 14 about an arm axial center, an advance/withdraw mechanism 16*a* for moving the holding arm 14 toward and away from the arrangement unit 5, and a positioning mechanism 16*b* for moving the holding arm 14 in a direction orthogonal to the advance/withdraw direction of the advance/withdraw mechanism 16*a*. By moving the pair of gripping portions 14*a* closer to each other, the strip material 23 is sandwiched and gripped between the gripping portions 14*a*. By moving the pair of gripping portions 14*a* away from each other, gripping of the strip material 23 sandwiched between the gripping portions 14*a* is released.

As the turning mechanism 15, a servo motor or the like that turns the holding arm 14 by an arbitrary angle or by 180° can be used. As the advance/withdraw mechanism 16*a* and the positioning mechanism 16*b*, a servo motor, a fluid cylinder, or the like for moving the holding arm 14 can be used.

The arrangement unit 5 includes a base frame 5*a* placed in a fixed state on the floor, a pair of compression bonding rollers 6 attached to the base frame 5*a*, and a movement mechanism 7 for horizontally moving the compression bonding rollers 6 toward and away from each other. The movement mechanism 7 is constituted of, for example, a ball screw and a servo motor for rotating the ball screw. Alternatively, a fluid cylinder or the like can be used as the movement mechanism 7. Each of the compression bonding rollers 6 may be horizontally moved independently, or may be horizontally moved in synchronization with each other.

The arrangement unit 5 further includes a pressing body 8 which moves up and down between the compression bonding rollers 6 and guides 9 which are disposed in the vicinity of the respective compression bonding rollers 6. Each of the guides 9 has guide rollers externally fitted thereto and at a distance in the axial direction of the rotation shaft. Each of the guides 9 is installed at a position on the outer side (the side in the direction in which the compression bonding rollers 6 move away from each other) with respect to the adjacent compression bonding roller 6, and is horizontally movable together with the adjacent compression bonding roller 6. Each of the guides 9 is preferably movable toward and away from the adjacent compression bonding roller 6 in the horizontal direction.

The bonding mechanism 3 bonds one strip material 23 placed in the arrangement unit 5 to a forming surface 21*a* positioned on the outer circumferential side of the rigid core 2. In this embodiment, a universal arm 4 for moving the rigid core 2 to an arbitrary position is used as the bonding mechanism 3. An industrial robot or the like can be exemplified as the universal arm 4. The center shaft 2*a* of the rigid core 2 is held at the leading edge portion of the universal arm 4, and the rigid core 2 is rotatable about the center shaft 2*a*. The rigid core 2 is also rotatable about a turning axis Z.

The bonding mechanism 3 is not limited to a configuration in which the rigid core 2 is moved with respect to the arrangement unit 5 (base frame 5*a*) fixed at a predetermined position as in this embodiment, and may be configured such that the arrangement unit 5 is moved with respect to the rigid core 2 fixed at a predetermined position or may be configured such that both the rigid core 2 and the arrangement unit 5 are moved.

Next, an example of a procedure for manufacturing the tire T by the tire manufacturing method according to an embodiment of the present technology will be described.

Figure 5:
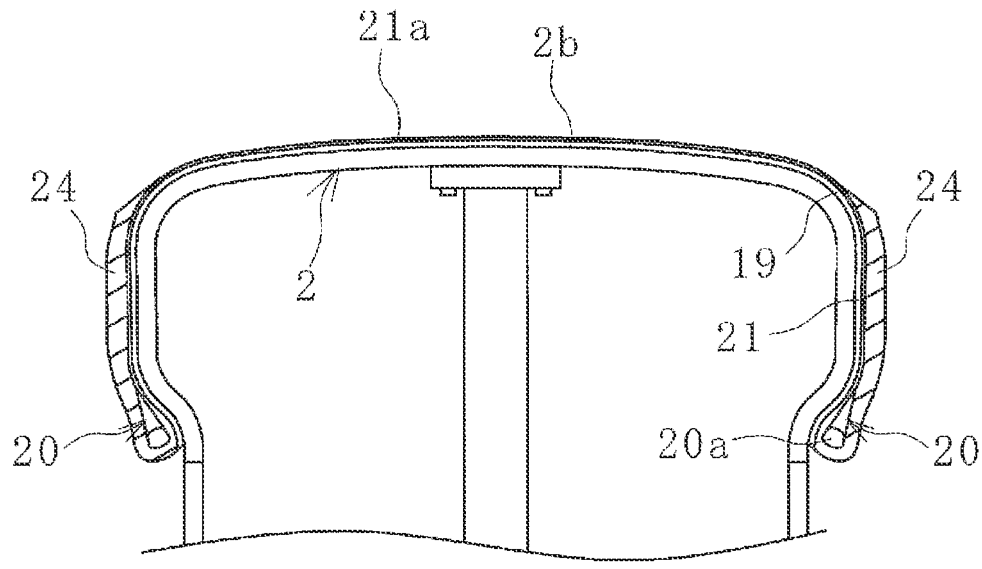
FIG. 5 is an explanatory diagram illustrating an upper half of a green tire in the middle of being formed with some tire components bonded in a cross-sectional view.

On the outer circumferential surface 2*b* of the rigid core 2 illustrated in FIG. 4, predetermined tire components (an innerliner 19, a carcass layer 21, and the like) are sequentially bonded by a known method as illustrated in FIG. 5. Specifically, the innerliner 19 and the carcass layer 21 are sequentially layered and bonded to the outer circumferential surface 2*b* of the rigid core 2 to form cylindrical shapes, respectively. On both side surfaces of the rigid core 2 in the width direction, ring-shaped bead members 20 are disposed on the carcass layer 21, and the carcass layer 21 is folded back around a bead core 20*a* of each bead member 20. Further, unvulcanized side rubbers 24 are layered and bonded to both end portions of the carcass layer 21 in the width direction. Other tire components are bonded thereto as necessary.

Next, a cylindrical belt multilayer structure 22 is constructed on the outer circumferential surface (forming surface 21*a*) of the cylindrical carcass layer 21 bonded to the outer circumferential side of the rigid core 2 in FIG. 5. The belt multilayer structure 22 is formed by vertically layering cylindrical belt layers 22*a*. Each belt layer 22*a* is formed by bonding a large number of strip materials 23. The strip material 23 is formed by coating a plurality of reinforcing cords 23*a* with an unvulcanized rubber.

Figure 6:
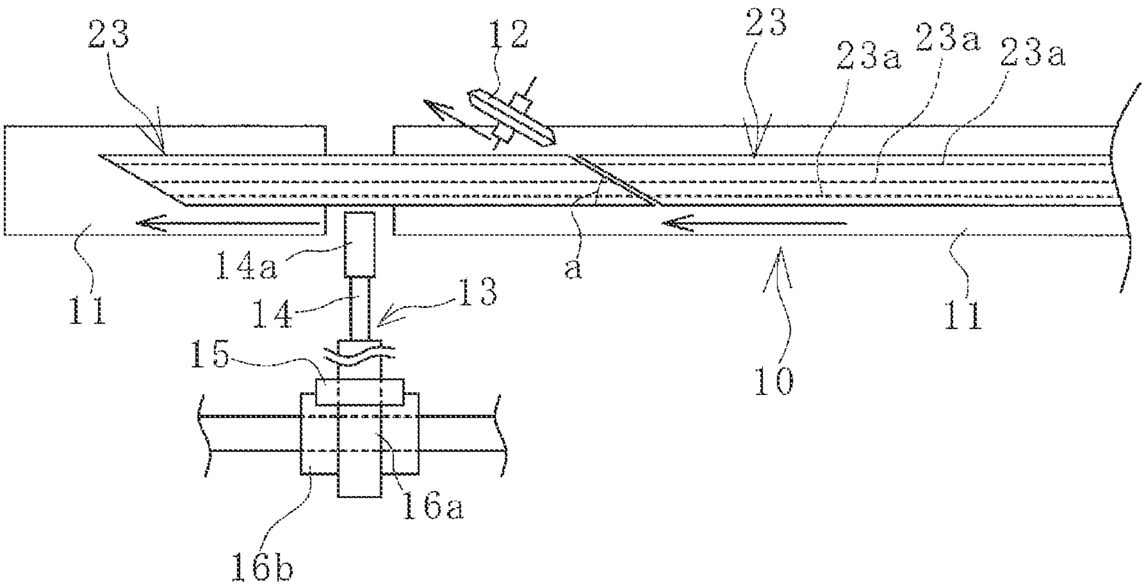
FIG. 6 is an explanatory diagram illustrating a step of supplying the strip material to the holding machine in a plan view.

As illustrated in FIG. 6, in order to form the belt layer 22*a* (belt multilayer structure 22), the strip material 23 is supplied to the holding machine 13 from a supply source through the strip material supply line 10. The elongated body of the strip material 23 is supplied toward the holding machine 13 by a preset length of one strip material 23. The holding machine 13 is placed in the middle of the strip material supply line 10.

The cutting portion 12 cuts the supplied elongated body of the strip material 23 to a preset length of one piece to form one strip material 23. Both ends of the strip material 23 in the longitudinal direction are cut at a predetermined inclination angle a with respect to the longitudinal direction so as to be parallel to each other. The cut one strip material 23 is disposed in front of the holding machine 13. At this time, the gripping portions 14*a* of the holding machine 13 are at a standby position.

Figure 7:
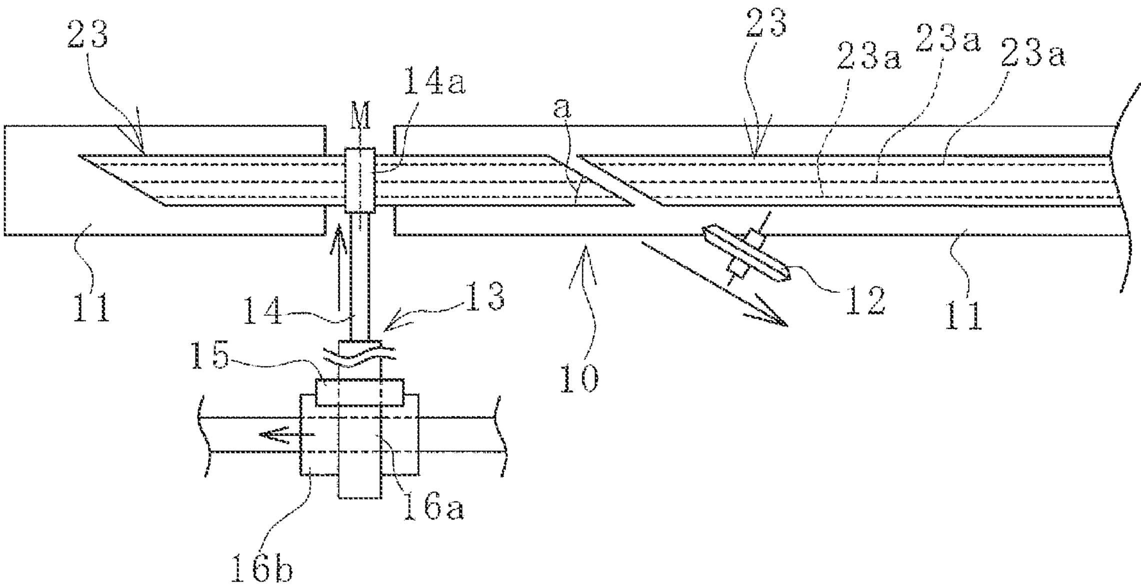
FIG. 7 is an explanatory diagram illustrating a state where the strip material in FIG. 6 is held and positioned by the holding machine in a plan view.

Next, as illustrated in FIG. 7, the holding arm 14 is advanced by the advance/withdraw mechanism 16*a*, and a longitudinal center portion M of the strip material 23 is vertically sandwiched and gripped by the pair of gripping portions 14*a*. The holding arm 14 is moved by the positioning mechanism 16*b* to position the longitudinal center portion M of the strip material 23 at an intermediate position (position of the pressing body 8) between the pair of compression bonding rollers 6 of the arrangement unit 5. The cutting portion 12 is moved to the standby position.

Figure 8:
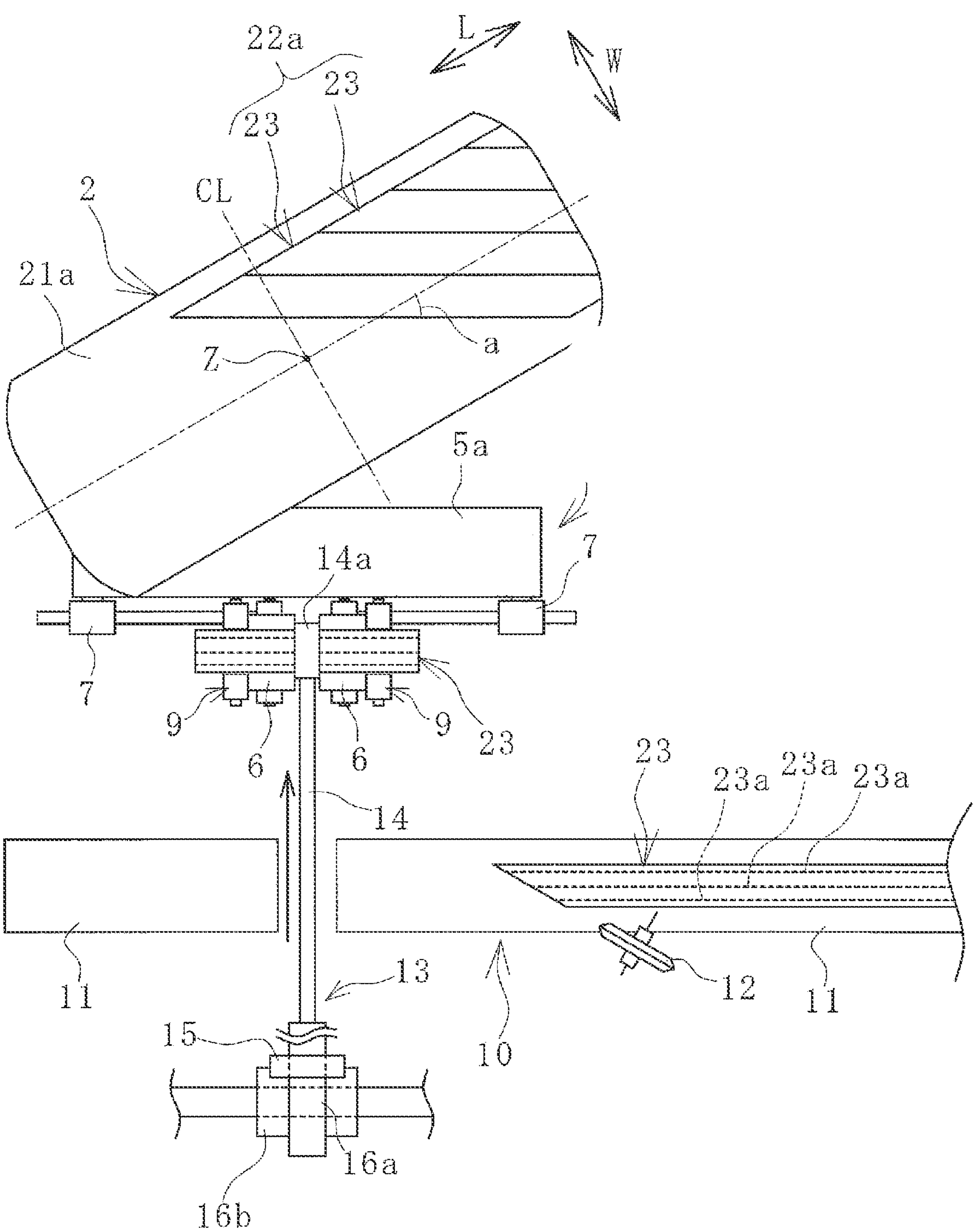
FIG. 8 is an explanatory diagram illustrating a step of placing the strip material in FIG. 7 in the arrangement unit in a plan view.

Next, as illustrated in FIG. 8, the holding arm 14 is further advanced by the advance/withdraw mechanism 16*a* to be moved to above the arrangement unit 5 (the pair of compression bonding rollers 6). The moved one strip material 23 is disposed so as to be bridged on the pair of compression bonding rollers 6. At this time, the pair of compression bonding rollers 6 are positioned close to each other, and the pressing body 8 is positioned so as not to protrude upward from each compression bonding roller 6. Note that, in FIGS. 8 to 14, 16, and 17 described below, tire components other than the belt layer 22*a* (strip material 23) are omitted and not illustrated.

Figure 9:
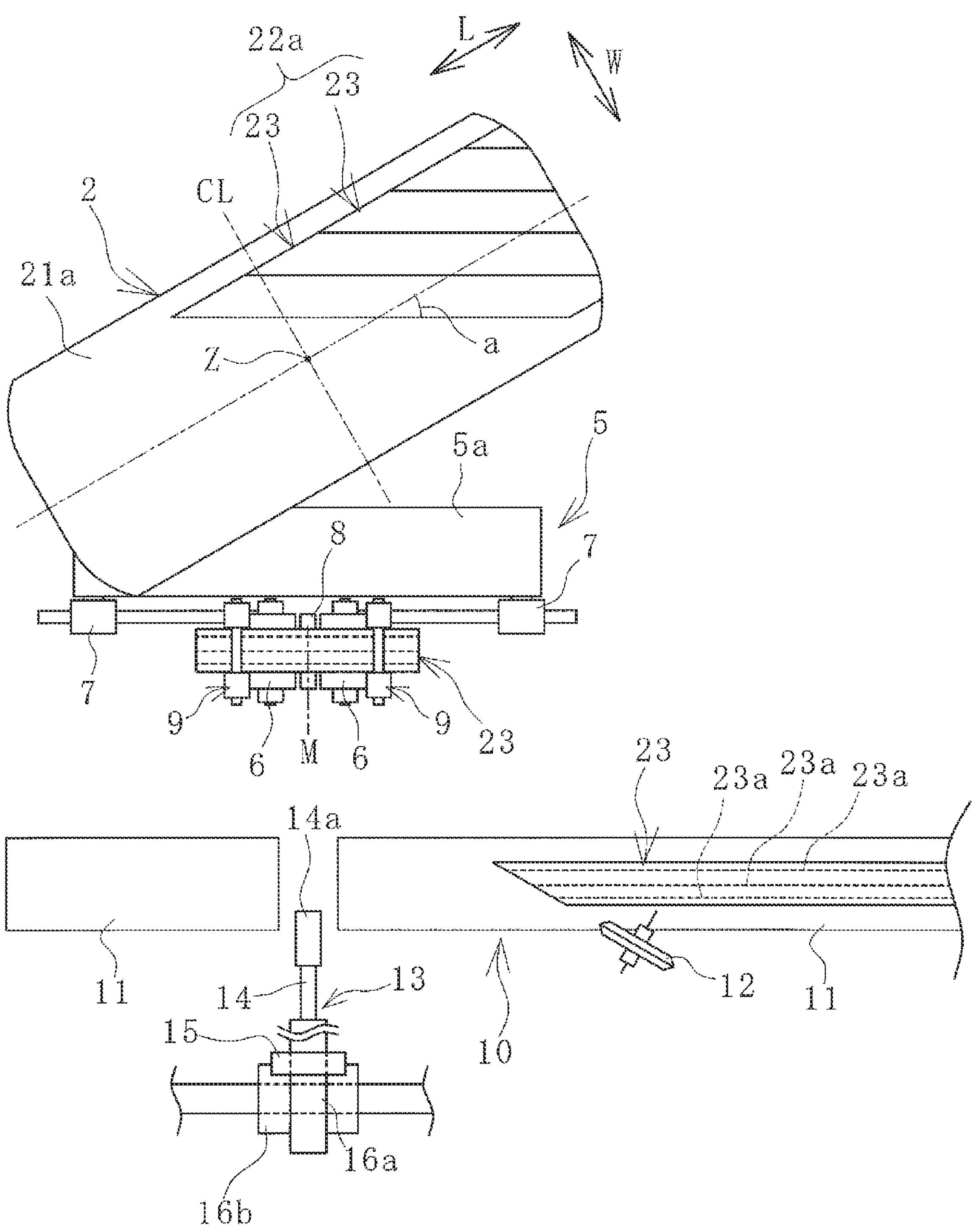
FIG. 9 is an explanatory diagram illustrating a step of bonding the strip material to the green tire in FIG. 8 in a plan view of the forming device.

Thereafter, the gripping portions 14*a* are moved away from each other to release the gripping of the strip material 23, and as illustrated in FIG. 9, the holding arm 14 is retracted to the standby position by the advance/withdraw mechanism 16*a*. The strip material 23 is inserted between the respective guides 9 and the adjacent compression bonding rollers 6. As a result, one strip material 23 is set on the pair of compression bonding rollers 6 in a state where the longitudinal center portion M thereof is positioned above the pressing body 8. The separation distance between the guide rollers of the respective guides 9 is set slightly larger than a strip width H of the strip material 23.

The shape data of the rigid core 2 is input to the control unit 17, and profile data of the outer circumferential surface 2*b* whose circumferential length varies depending on a position in the width direction is also input thereto. Various kinds of data such as shape data (lengths, widths, thicknesses) of the tire components (19, 20, 21, 22*a* and the like) to be used and specification data of the green tire G to be formed are also inputted.

Next, the rigid core 2 and the bonding mechanism 3 are caused to cooperate with each other to bond the strip material 23 set in the arrangement unit 5 to the outer circumferential surface of the carcass layer 21 layered on the outer circumferential side of the rigid core 2. That is, the outer circumferential surface of the carcass layer 21 serves as a forming surface 21*a* to which the strip material 23 is to be bonded.

In order to form the belt layer 22*a*, a large number of strip materials 23 (reinforcing cords 23*a*) are sequentially bonded to the forming surface 21*a* so as to be extended in a direction oblique (inclination angle a) to the circumferential direction of the rigid core 2 and arranged in the circumferential direction. Then, the strip materials 23 bonded to the forming surface 21*a* adjacent to each other in the circumferential direction are bonded together to form the belt layer 22*a*.

As described above, the outer circumferential surface 2*b* of the rigid core 2 has a profile in which the circumferential length varies depending on a position in the width direction. Since the innerliner 19 and the carcass layer 21 sequentially bonded to the outer circumferential surface 2*b* are members having constant thicknesses, the forming surface 21*a* to which the strip material 23 is bonded also has a profile in which the circumferential length (length in the circumferential direction) varies depending on a position in the width direction similarly to the outer circumferential surface 2*b*.

Figure 10:
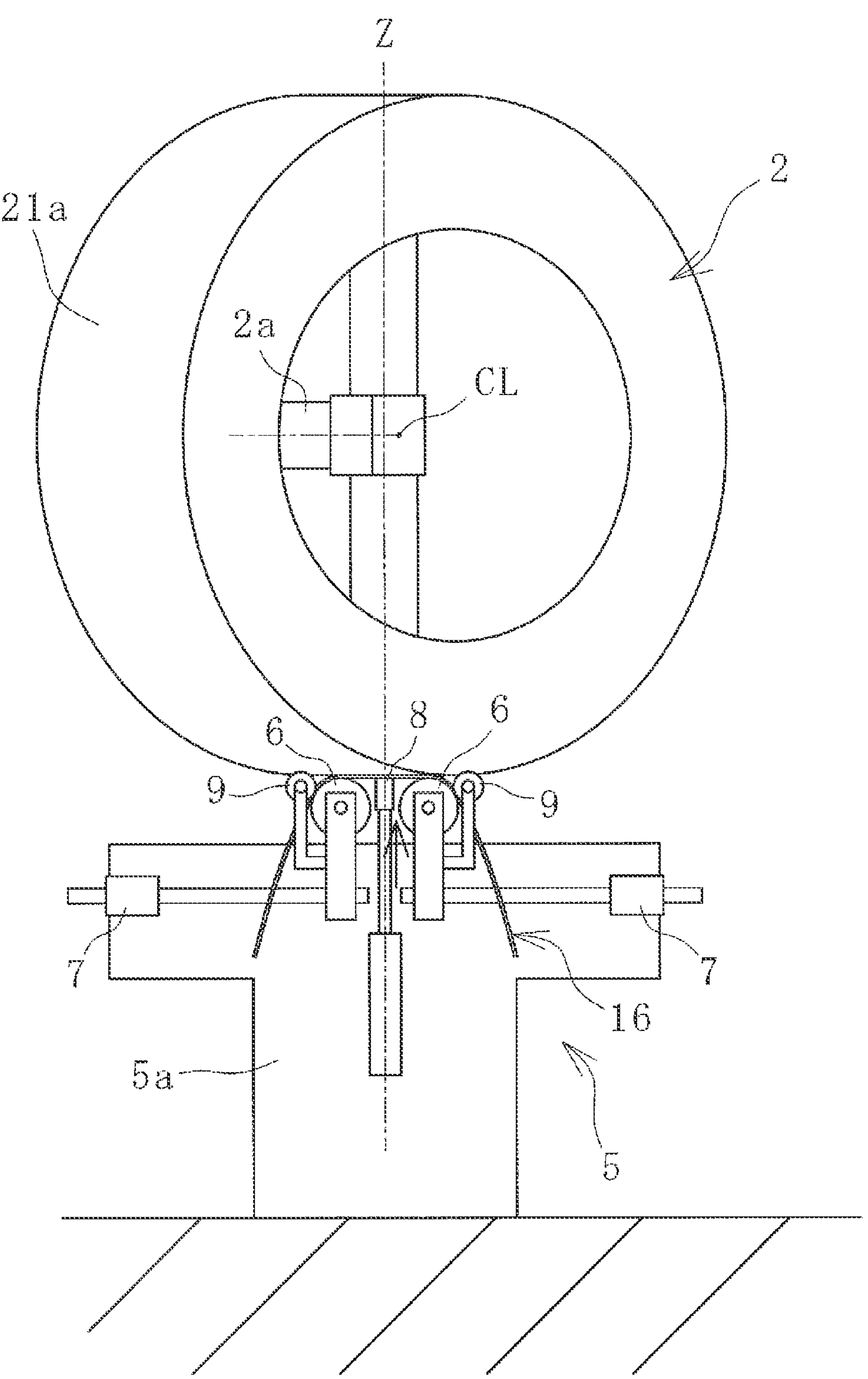
FIG. 10 is an explanatory diagram illustrating a state where the longitudinal center portion of the strip material is bonded to the green tire in FIG. 9 in a front view of the forming device.

Therefore, the belt layer 22*a* is formed by operating the rigid core 2 and the bonding mechanism 3 based on the profile of the outer circumferential surface 2*b* of the rigid core 2 which is input to the control unit 17 and grasped in advance. First, as illustrated in FIG. 10, the pressing body 8 is moved upward with respect to the strip material 23 bridged between the pair of compression bonding rollers 6. As a result, the longitudinal center portion M of the strip material 23 is pressed against the forming surface 21*a* at the central portion of the rigid core 2 in the width direction to be bonded.

Figure 11:
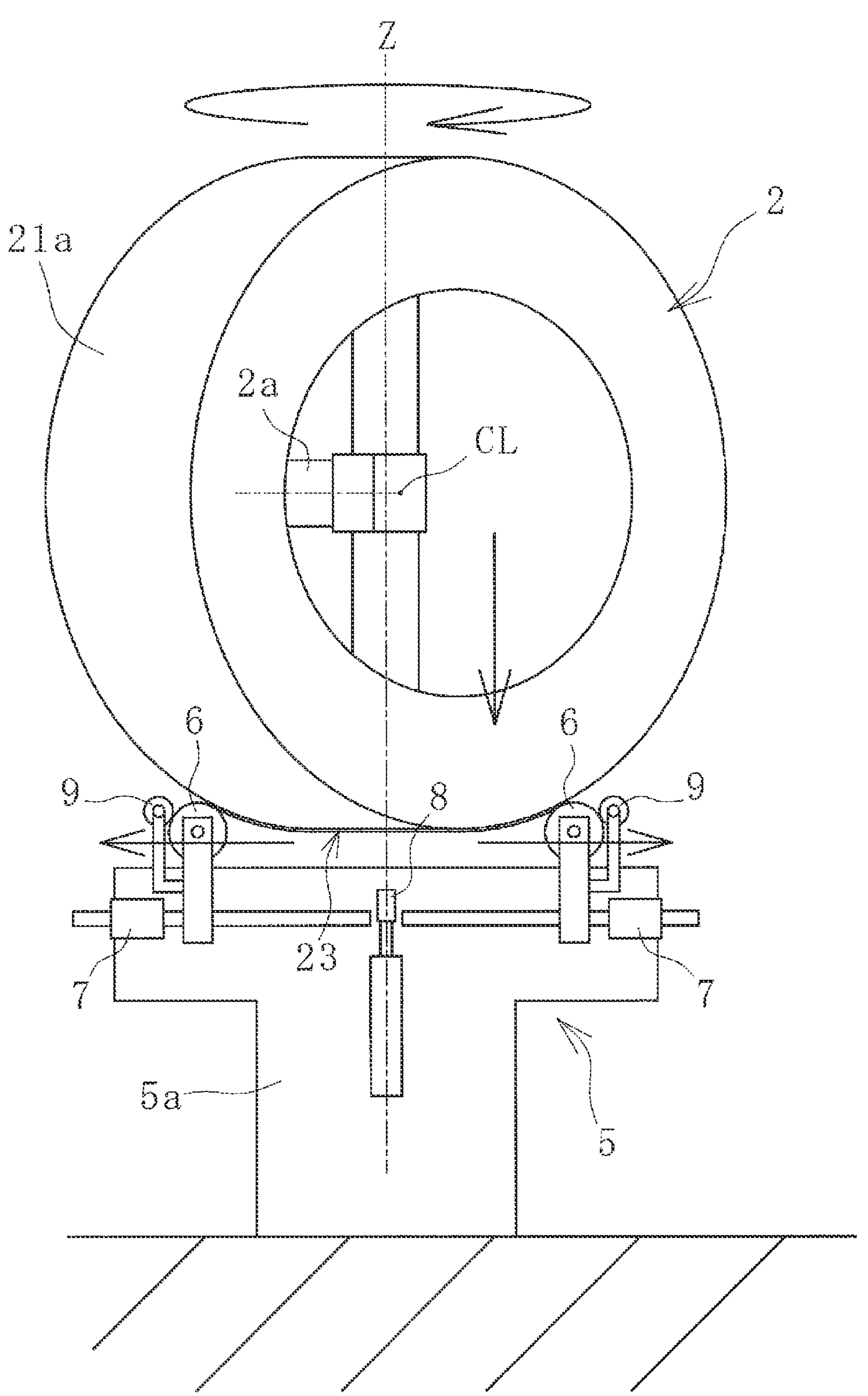
FIG. 11 is an explanatory diagram illustrating a state where the strip material is bonded to the green tire in FIG. 10 so as to be extended in the longitudinal direction in a front view of the forming device.
Figure 12:
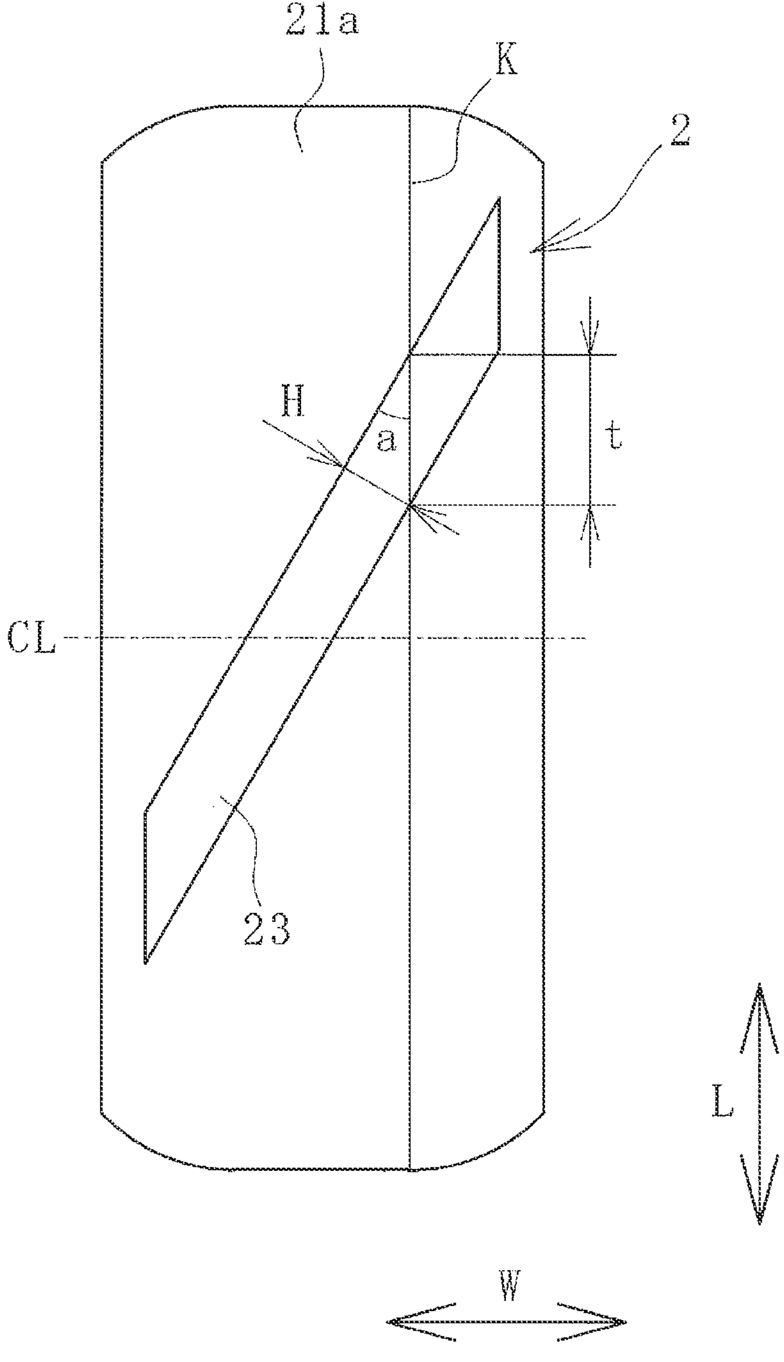
FIG. 12 is an explanatory diagram illustrating the turning angle of the rigid core when the strip material is bonded to the forming surface.

Next, as illustrated in FIG. 11, the rigid core 2 is moved downward so that the forming surface 21*a* is brought close to the strip material 23 to be bonded to the forming surface 21*a*, and the strip material 23 is extended in the longitudinal direction and bonded to the forming surface 21*a* while the rigid core 2 is turned about the turning axis Z. More specifically, along with the downward movement of the rigid core 2, the rigid core 2 is turned in a direction in which an angle in the circumferential direction of the rigid core 2 with respect to the longitudinal direction of the strip material 23 to be bonded changes so as to reduce variation in a bonding margin between the strip materials 23 to be bonded adjacent to each other in the circumferential direction of the forming surface 21*a* (bonding length in the circumferential direction between facing end surfaces of the strip materials 23 adjacent to each other in the circumferential direction) depending on the position of the rigid core 2 in the width direction. Since the adjacent strip materials 23 are basically butted and bonded to each other, the bonding margin is not plus or minus but is brought close to 0.

The circumferential length of the forming surface 21*a* is shorter at both end portions in the width direction of a range corresponding to a tread of the rigid core 2 than at the central portion in the width direction. Therefore, when the strip material 23 is bonded, the rigid core 2 is turned so that the inclination angle a becomes larger at both end portions in the width direction than at the central portion in the width direction.

Along with the turning of the rigid core 2, the pair of compression bonding rollers 6 are horizontally moved in directions away from each other. Thus, the strip material 23 to be bonded is sandwiched between the forming surface 21*a* and the compression bonding rollers 6, and the strip material 23 is extended in the longitudinal direction and is pressed against and bonded to the forming surface 21*a*.

For example, when it is preset that N strip materials 23 having the same specifications (strip widths H) are used to form the belt layer 22*a*, the rigid core 2 is turned as follows. A circumferential length K of the forming surface 21*a* at a position of the rigid core 2 in the width direction illustrated in FIG. 12 can be determined in advance. When the strip material 23 is bonded at the inclination angle a with respect to the circumferential direction of the rigid core 2, a length T of the strip material 23 with respect to the circumferential direction of the rigid core 2 at the position in the width direction is T=H/Sin (a). Since the circumferential length K=the length T×N, the following equation (1) is derived.

$$\text{Inclination angle } a=\text{Sin}^{-1}(H\cdot N/K) \quad (1)$$

Therefore, when each strip material 23 is bonded to the forming surface 21*a*, the rigid core 2 is turned so that the inclination angle a of the strip material 23 satisfies the above equation (1) in accordance with the position of the rigid core 2 in the width direction.

In this embodiment, since the profile of the rigid core 2 is symmetrical with respect to the center in the width direction, the longitudinal center portion M of the strip material 23 to be bonded is bonded to the forming surface 21*a* at the central portion of the rigid core 2 in the width direction, and then the strip material 23 is bonded from the longitudinal center portion M toward both ends in the longitudinal direction. Accordingly, it is advantageous for completing bonding of the strip material 23 in a shorter time.

When the profile of the rigid core 2 is asymmetric with respect to the center in the width direction, for example, the longitudinal center portion M of the strip material 23 to be bonded is bonded to the forming surface 21*a* at the central portion of the rigid core 2 in the width direction, and then the strip material 23 is bonded to the forming surface 21*a* from the longitudinal center portion M toward one end in the longitudinal direction. Thereafter, the strip material 23 may be bonded to the forming surface 21*a* from the longitudinal center portion M toward the other end in the longitudinal direction.

In this embodiment, a portion of the strip material 23 immediately before being bonded to the forming surface 21*a* is restricted from moving in the strip width direction by each guide 9. Therefore, even when the strip material 23 is bonded to the forming surface 21*a* while the rigid core 2 is turned, it is advantageous to prevent such a problem that the strip material 23 already bonded to the forming surface 21*a* is shifted and moved by this strip material 23.

Figure 13:
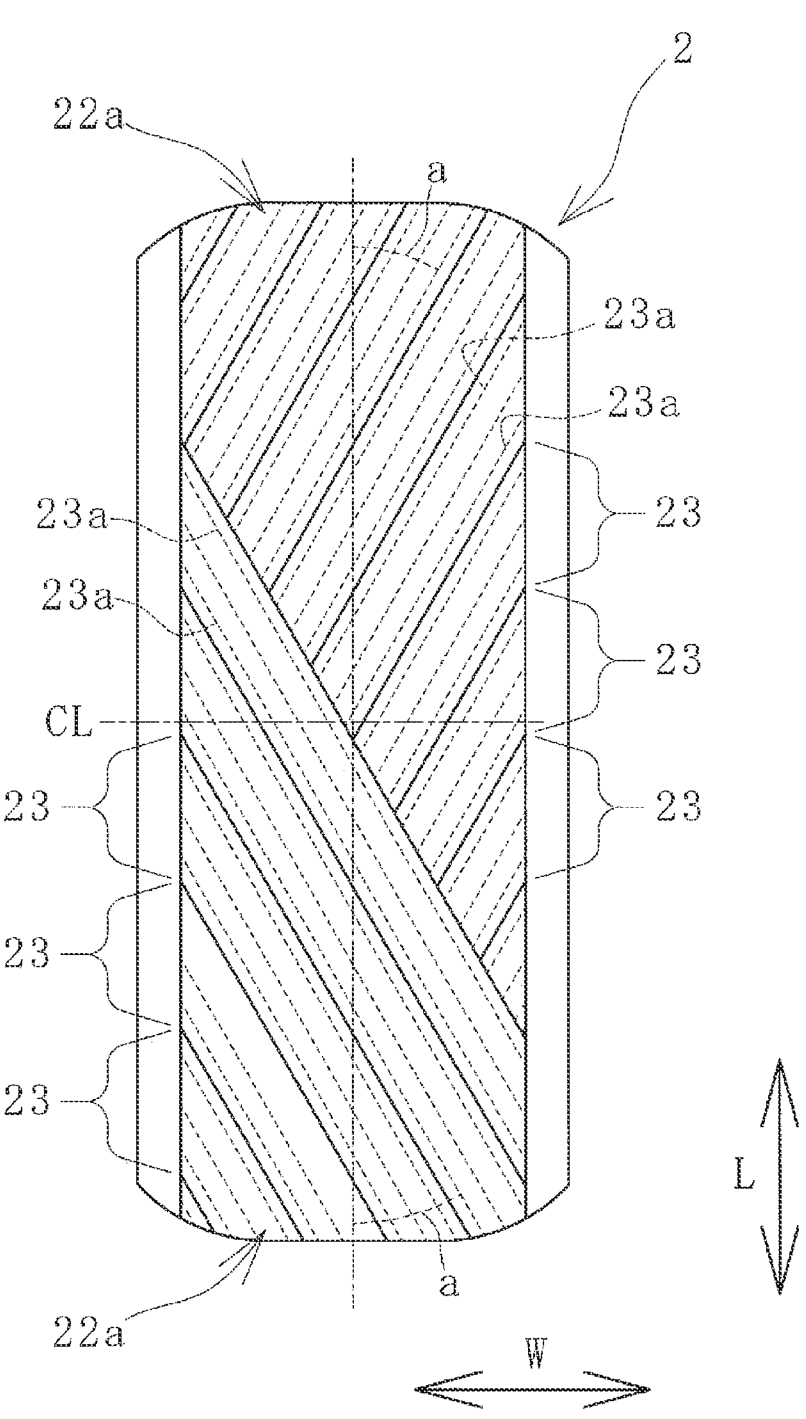
FIG. 13 is an explanatory diagram illustrating the green tire in the middle of being formed with a belt layer in a tire front view.

By repeating the step of sequentially bonding one strip material 23 to the forming surface 21*a* in this manner, each belt layer 22*a* illustrated in FIG. 13 is formed. In FIG. 13, of the belt layers 22*a* on the inner circumferential side and the outer circumferential side constituting the belt multilayer structure 22, the belt layer 22*a* on the inner circumferential side is formed in a cylindrical shape and completed, but the belt layer 22*a* on the outer circumferential side is in an incomplete state.

In the belt layer 22*a* on the inner circumferential side and the belt layer 22*a* on the outer circumferential side, the inclination directions of the respective reinforcing cords 23*a* with respect to the circumferential direction of the rigid core 2 are opposite to each other. Therefore, the holding machine 13 of the forming device 1 is provided with a turning mechanism 15. When the belt layer 22*a* on the outer circumferential side is layered on the belt layer 22*a* on the inner circumferential side for formation, the forming surface 21*a* to which the strip material 23 is bonded is a surface of the belt layer 22*a* on the inner circumferential side.

Figure 14:
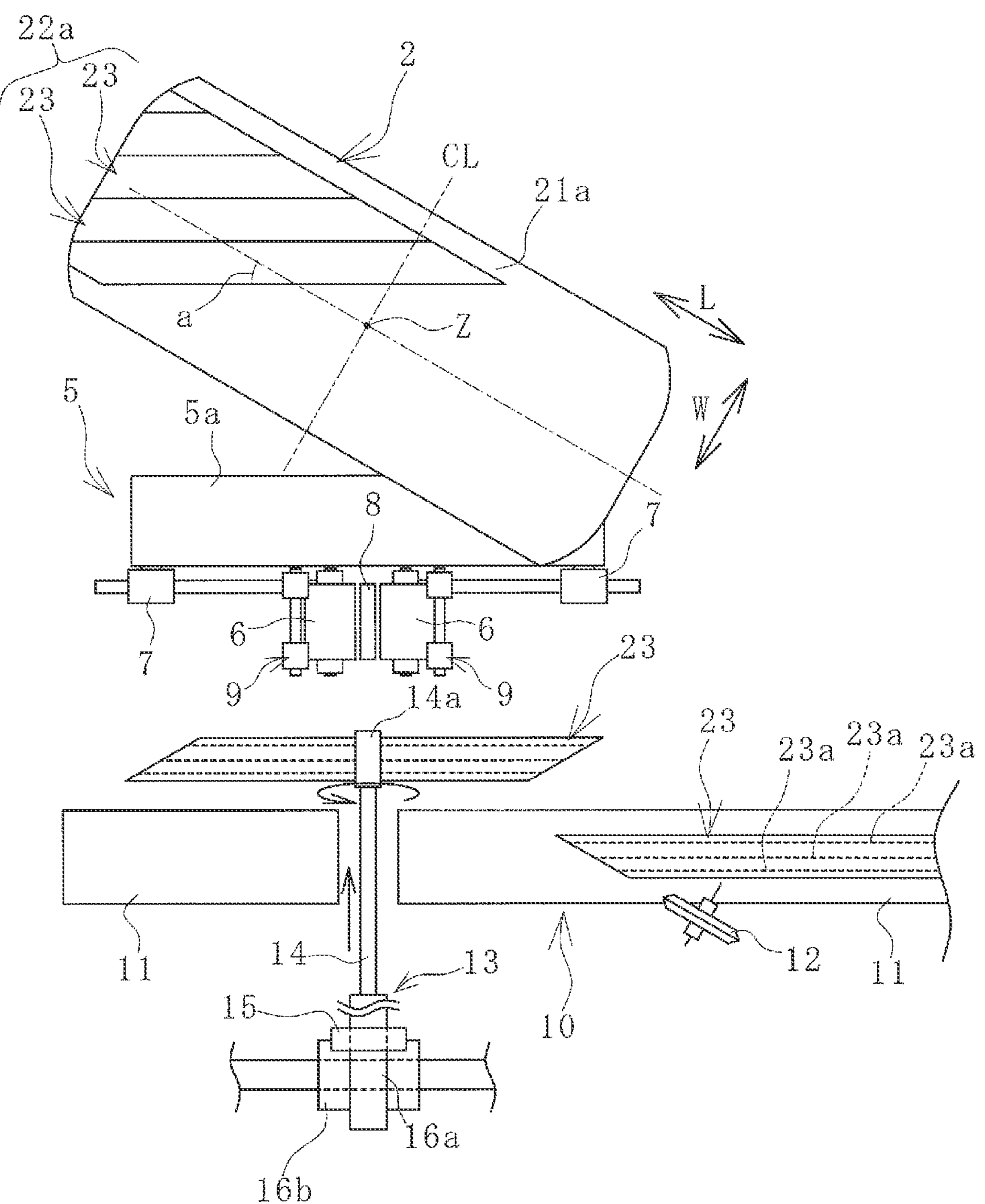
FIG. 14 is an explanatory diagram illustrating a step of turning the strip material and placing the strip material in the arrangement unit in a plan view.
Figure 15:
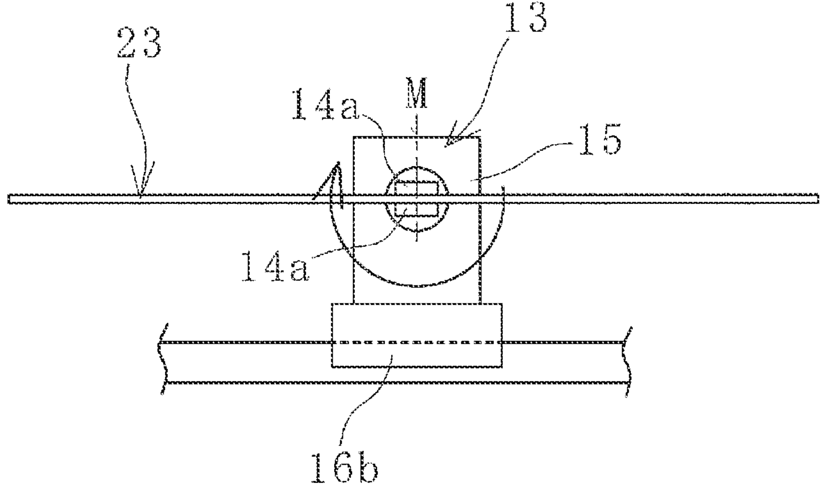
FIG. 15 is an explanatory diagram illustrating the holding machine holding the strip material in FIG. 14 in a front view from the arrangement unit side.

When the belt multilayer structure 22 is constructed, as illustrated in FIGS. 14 and 15, the holding arm 14 of the holding machine 13 holding one strip material 23 is turned about the arm axial center by the turning mechanism 15. Accordingly, the strip material 23 held by the holding machine 13 is turned upside down about an axis orthogonal to the longitudinal direction of the strip material 23.

The holding arm 14 is further advanced to place the turned strip material 23 in the arrangement unit 5 (the pair of compression bonding rollers 6). A step before the strip material 23 is held by the holding machine 13 and a step after the strip material 23 is placed in the arrangement unit 5 are the same as in the case of forming the belt layer 22*a* on the inner circumferential side. However, the orientation of the rigid core 2 in a plan view is opposite to that in FIG. 8 (the orientation is symmetrical with respect to the axial center direction of the holding arm 14).

In this way, the strip material 23 set in the arrangement unit 5 is turned upside down and a series of steps is sequentially repeated to form the belt layer 22*a* on the outer circumferential side and construct the belt multilayer structure 22. In order to stably turn the strip material 23, it is preferable that the longitudinal center portion M of the strip material 23 is gripped by the pair of gripping portions 14*a*.

The holding machine 13 may have any structure as long as it can turn the strip material 23 upside down, and thus other structures may be employed. In the holding machine 13 illustrated in FIGS. 16 and 17, a hydraulic cylinder for advancing/withdrawing the holding arm 14 having the pair of gripping portions 14*a* at the tip thereof is used as the positioning mechanism 16*b*, and a servo motor or the like for moving the holding arm 14 along a rail extending in a direction orthogonal to the advance/withdraw direction of the holding arm 14 is used as the advance/withdraw mechanism 16*a*.

Figure 16:
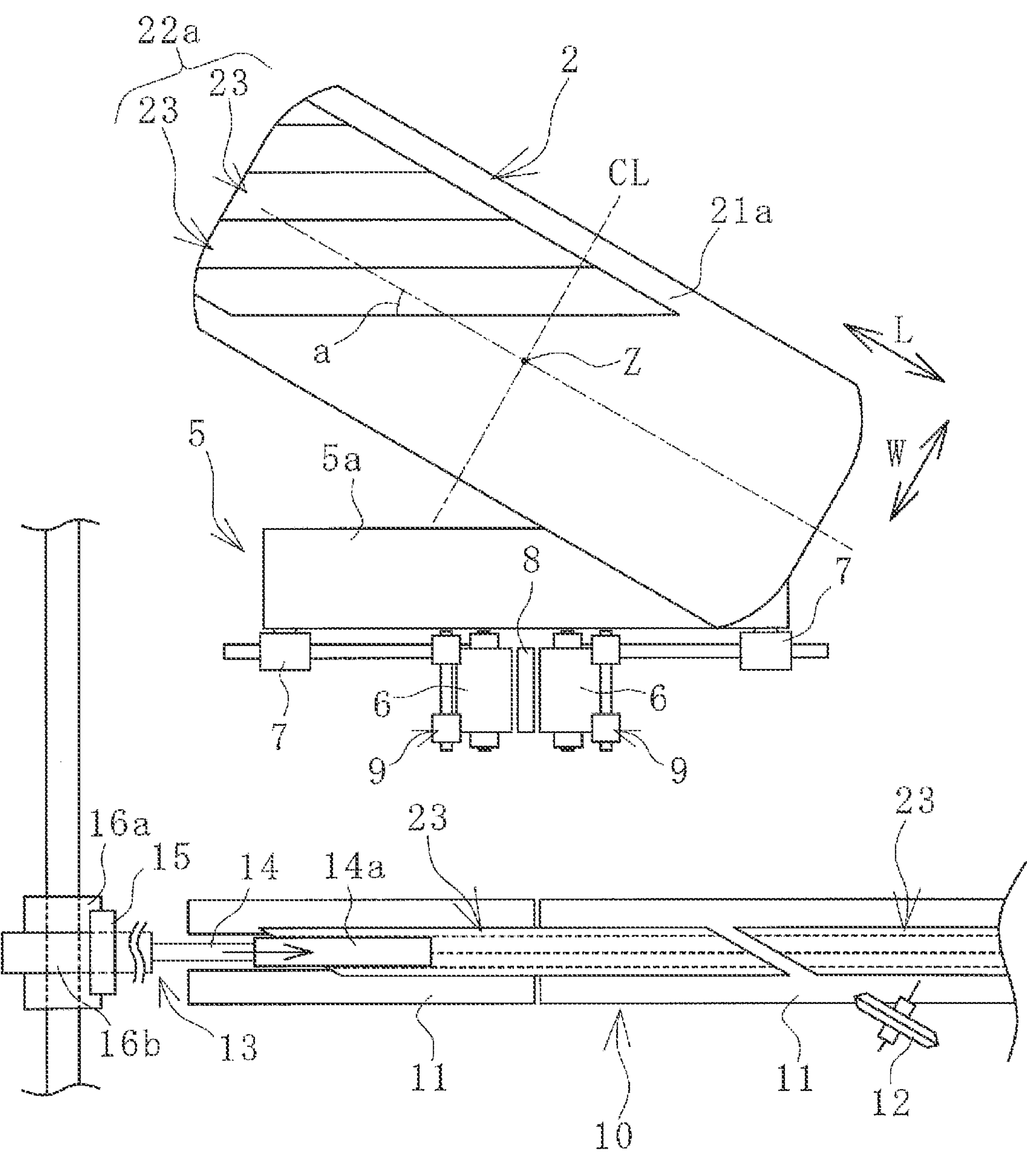
FIG. 16 is an explanatory diagram illustrating a modified example of the holding machine holding the strip material in a plan view.

As illustrated in FIG. 16, in the holding machine 13, one strip material 23 supplied through the strip material supply line 10 is inserted between the pair of gripping portions 14*a* from one end portion side in the longitudinal direction and sandwiched and held between the gripping portions 14*a*. The strip material 23 is preferably held such that the center portion of the strip material 23 in the width direction coincides with the arm axial center of the holding arm 14. Thereafter, the holding arm 14 is moved toward the arrangement unit 5 by the advance/withdraw mechanism 16*a*.

Figure 17:
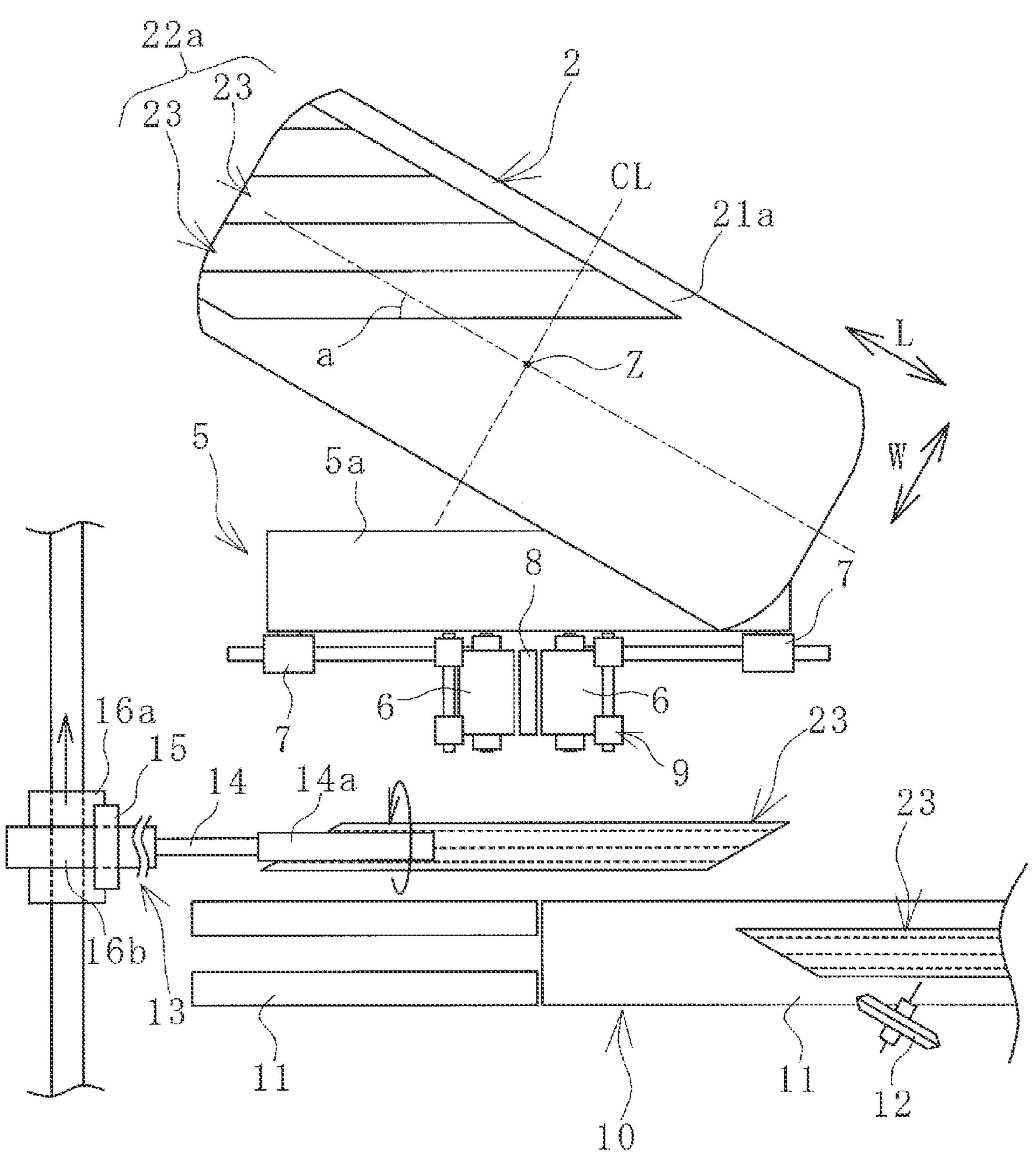
FIG. 17 is an explanatory diagram illustrating a step of turning the strip material in FIG. 16 and placing the strip material in the arrangement unit in a plan view.

Next, as illustrated in FIG. 17, at a position between the strip material supply line 10 and the arrangement unit 5, the holding arm 14 of the holding machine 13 holding one strip material 23 is turned about the arm axial center by the turning mechanism 15. Accordingly, the strip material 23 held by the holding machine 13 is turned upside down about a parallel axis with respect to the longitudinal direction of the strip material 23.

Thereafter, the holding arm 14 is moved above the arrangement unit 5 (the pair of compression bonding rollers 6) by using the advance/withdraw mechanism 16*a* and the positioning mechanism 16*b*, and the turned strip material 23 is placed in the arrangement unit 5. As described above, when the strip material 23 is turned upside down, the strip material 23 can be turned about an orthogonal axis with respect to the longitudinal direction of the strip material 23 or can be turned about a parallel axis with respect to the longitudinal direction of the strip material 23. Whether the strip material 23 is turned about the orthogonal axis or the parallel axis is determined in consideration of a placement space of the equipment or the like but the structures illustrated in FIGS. 14 and 15 are advantageous for more accurately placing the strip material 23 at a predetermined position of the arrangement unit 5.

Figure 18:
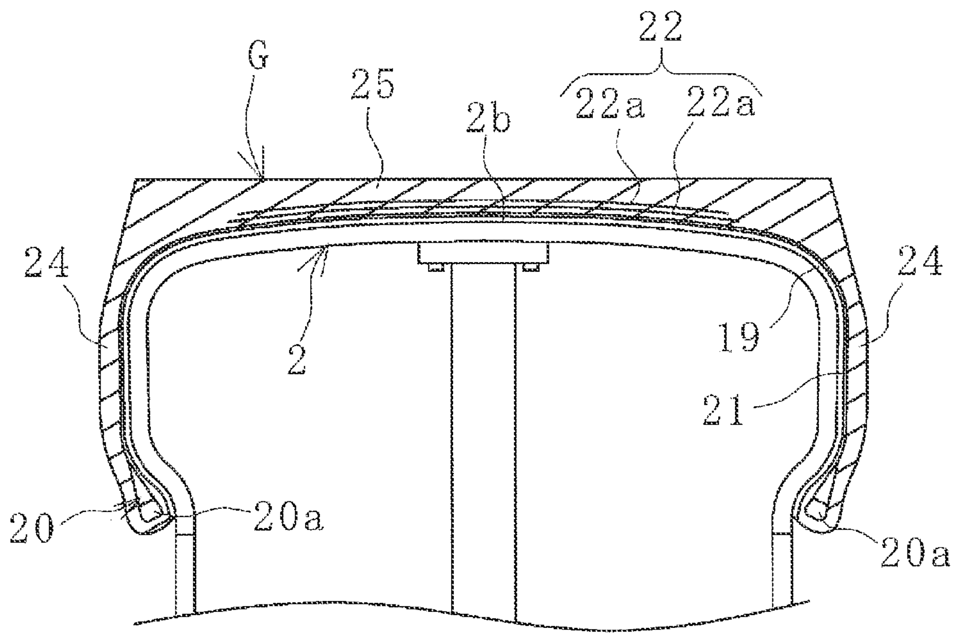
FIG. 18 is an explanatory diagram illustrating an upper half of the formed green tire in a cross-sectional view.

In order to form the green tire G illustrated in FIG. 18, after the belt multilayer structure 22 is constructed by the above-described procedure, necessary tire components such as the belt reinforcing layer and the unvulcanized tread rubber 25 are sequentially bonded to the outer circumferential surface of the belt multilayer structure 22. Thus, the green tire G having the belt multilayer structure 22 is formed.

Figure 19:
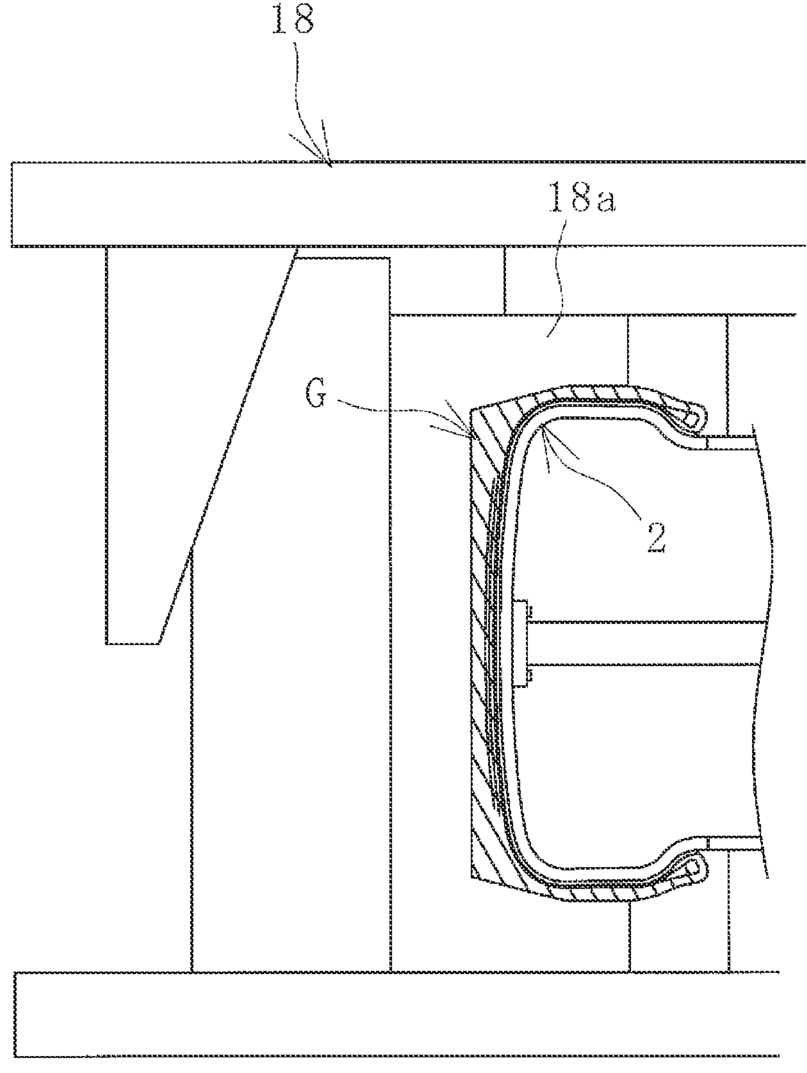
FIG. 19 is an explanatory diagram illustrating a step of vulcanizing the green tire in a cross-sectional view of the vulcanization device.
Figure 20:
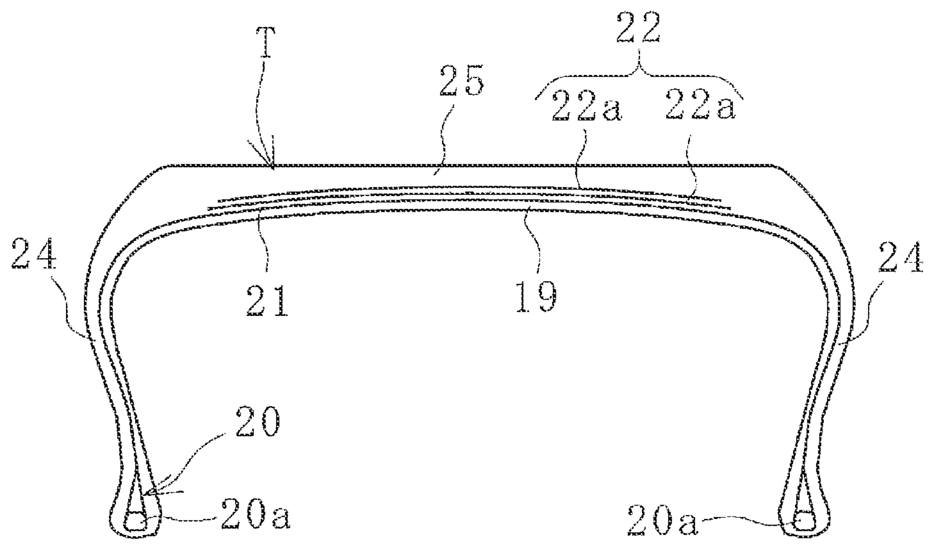
FIG. 20 is an explanatory diagram illustrating an upper half of the manufactured tire after vulcanization in a cross-sectional view.

Next, as illustrated in FIG. 19, the green tire G is disposed together with the rigid core 2 inside a vulcanization mold 18*a* placed in a vulcanization device 18, and the vulcanization mold 18*a* is closed. Next, the green tire G is vulcanized under predetermined conditions inside the closed vulcanization mold 18*a*, thereby completing the tire T (the pneumatic tire T in this embodiment) illustrated in FIG. 20. After being removed from the vulcanization mold 18*a*, the rigid core 2 is separated from the completed tire T.

When manufacturing a tire T integrated with a wheel, for example, the wheel can be used as the rigid core 2. When manufacturing the tire T having such specifications, it is not necessary to separate the completed tire T from the rigid core 2 (wheel) after the green tire G is vulcanized.

As described above, according to an embodiment of the present technology, the strip material 23 can be turned upside down and placed in the arrangement unit 5 by the holding machine 13 that holds the strip material 23 that is sequentially supplied. Therefore, in order to construct the belt multilayer structure 22 in which the inclination directions of the reinforcing cords 23*a* of the vertically adjacent belt layers 22*a* are opposite to each other, the forming device 1 only needs to include one strip material supply line 10 that sequentially feeds one strip material 23 to the holding machine 13.

When separate supply lines are provided to supply two types of strip materials 23 in which the inclination directions of the reinforcing cords 23*a* are opposite to each other in order to construct the belt multilayer structure 22, it is necessary to provide the conveying mechanism 11, the cutting portion 12, the holding machine 13, and the like for each of the two types of strip materials 23. That is, since it is necessary to provide the same equipment in duplicate, there arises a demerit that a wider space is required for placing the equipment and a demerit that equipment cost is increased. In addition, there is also a demerit that it is disadvantageous to increase the operation rate of the equipment provided in duplicate.

Since only one strip material supply line 10 is required in the present technology, the equipment for constructing the belt multilayer structure 22 can be made considerably more compact. Accordingly, the above-described various demerits can be eliminated.

It is more preferable that the cutting angle with respect to the strip material 23 by the cutting portion 12 be able to be arbitrarily set. With this configuration, the reinforcing cords 23*a* of the strip material 23 to be bonded can be set at an arbitrary predetermined inclination angle a with respect to the circumferential direction of the rigid core 2. Therefore, the forming device 1 has high versatility and can form the green tire G with more various specifications.

When the outer circumferential surface 2*b* of the rigid core 2 has a profile in which the circumferential length varies depending on a position in the width direction, as described above, each strip material 23 is bonded to the forming surface 21*a* to form the belt layer 22*a* on the basis of the profile data grasped in advance. Therefore, it is advantageous to prevent a problem that the strip materials 23 bonded to the forming surface 21*a* and adjacent to each other in the circumferential direction excessively overlap each other in the circumferential direction or a problem that a gap in the circumferential direction is generated between the adjacent strip materials 23. Therefore, it is possible to suppress a bonding disturbance between the strip materials 23 caused by the circumferential length of the outer circumferential surface 2*b* of the rigid core 2 which varies depending on a position in the width direction. This also contributes to improvement in quality of the manufactured tire T.

Figure 21:
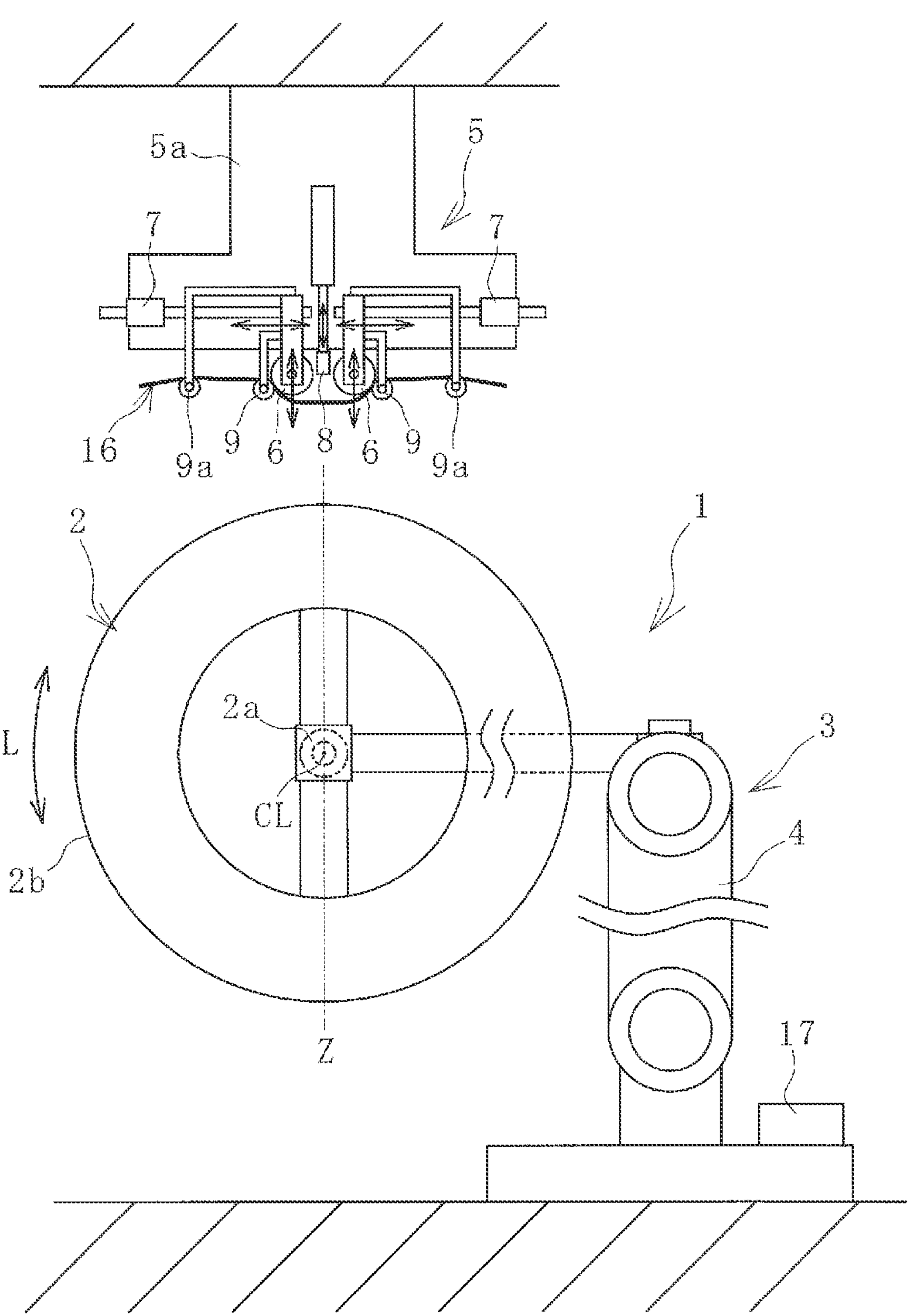
FIG. 21 is an explanatory diagram illustrating an embodiment of the forming device in which the rigid core is disposed below the arrangement unit in a front view.

In the above-described forming device 1, the belt layer 22*a* is formed in a state where the rigid core 2 is disposed above the arrangement unit 5. However, as in the forming device 1 illustrated in FIG. 21, the rigid core 2 may be disposed below the arrangement unit 5 to form the belt layer 22*a* (belt multilayer structure 22). In the forming device 1, the arrangement unit 5 (base frame 5*a*) is suspended downward from a support surface and placed in a fixed state, and the rigid core 2 can be moved by the universal arm 4.

This forming device 1 has a configuration in which the vertical relationship between the rigid core 2 and the arrangement unit 5 of the forming device 1 illustrated in FIGS. 1 and 2 is reversed, and other configurations are substantially the same. However, the forming device 1 has the support rollers 9*a* outside the respective guides 9. The strip material 23 is inserted between the compression bonding rollers 6 and the guides 9 and bridged between the pair of compression bonding rollers 6, and both end portions of the strip material 23 in the longitudinal direction are supported by the support rollers 9*a*, respectively. In the forming device 1, the configuration in which the pair of compression bonding rollers 6 can be moved up and down is not essential, and may be adopted as necessary. The procedure for forming the green tire G using the forming device 1 is the same as the procedure described in the previous embodiment.

Figure 22:
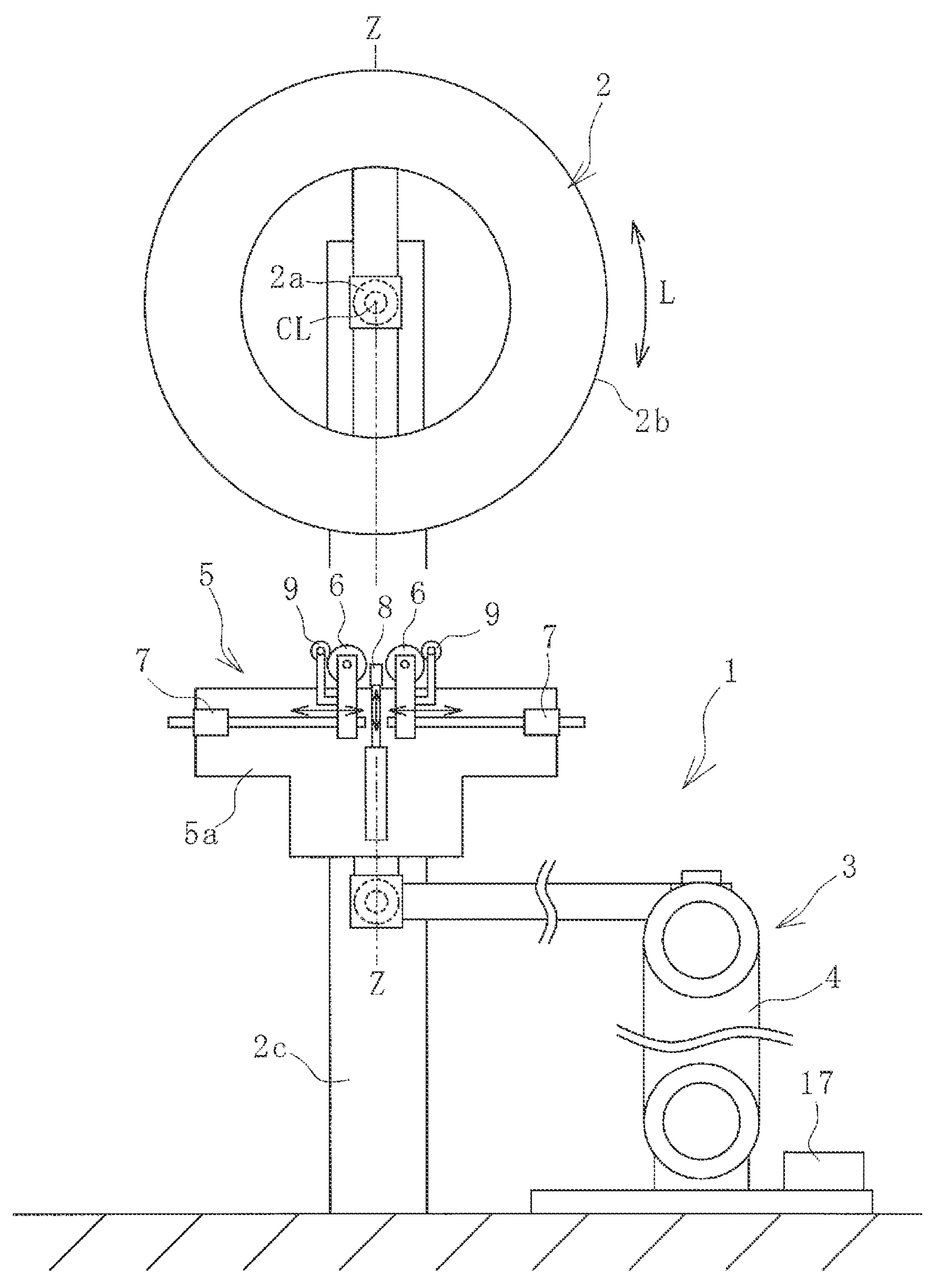
FIG. 22 is an explanatory diagram illustrating a part of another embodiment of the forming device in a front view.
Figure 23:
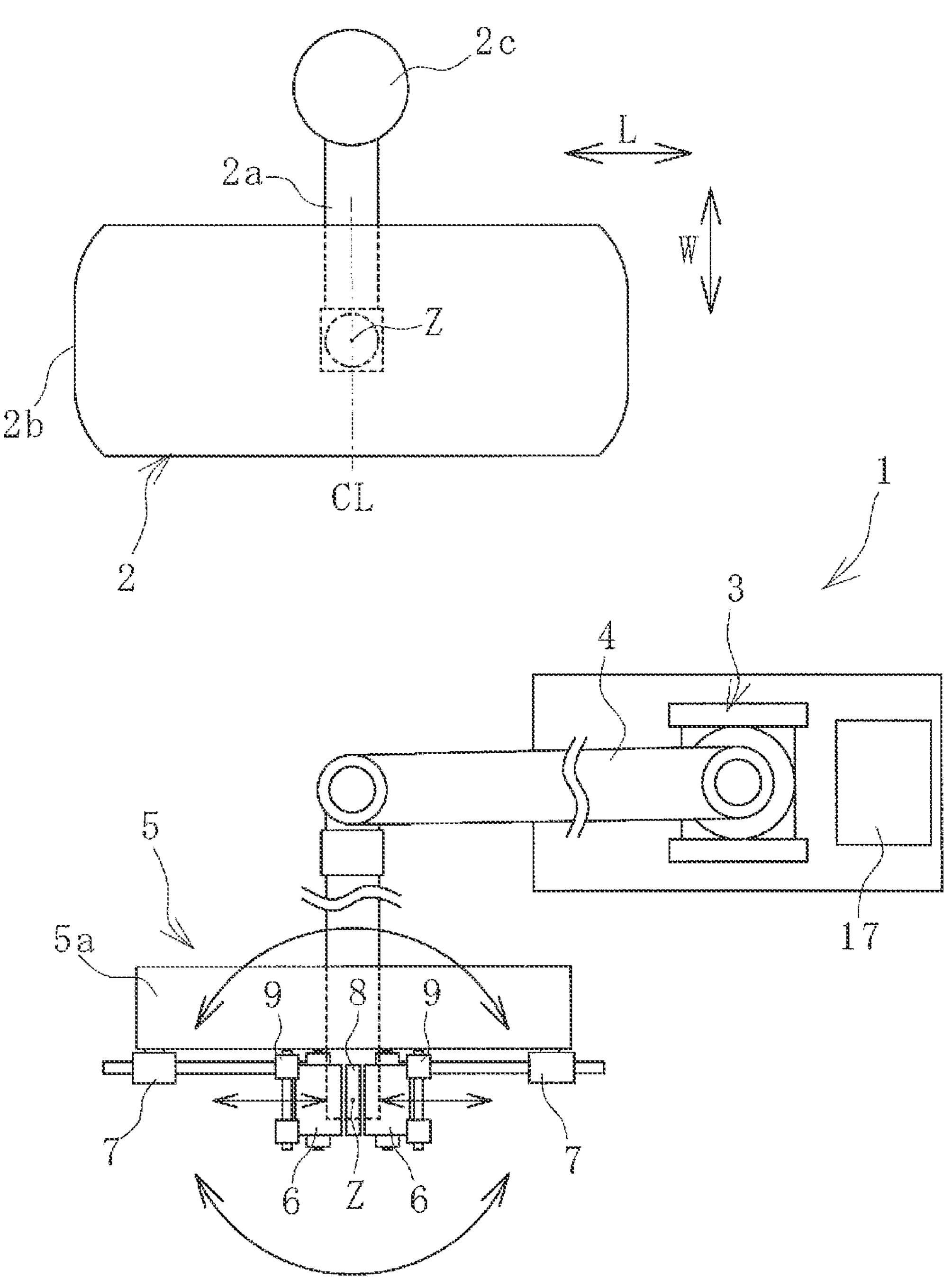
FIG. 23 is an explanatory diagram illustrating the forming device in FIG. 22 in a plan view.

In another embodiment of the forming device 1 illustrated in FIGS. 22 and 23, the rigid core 2 is rotatable about the center shaft 2*a* fixed to a supporting column 2*c* erected on the floor. That is, the rigid core 2 is placed in a fixed state on the floor (in a state where it cannot move in a plane). The arrangement unit 5 is placed to be movable to an arbitrary position by the universal arm 4. The arrangement unit 5 is turnable about the turning axis Z extending vertically through the center of the pressing body 8 in a plan view. Note that the rigid core 2 is fixed so as not to be able to turn about the turning axis Z.

The procedure for forming the green tire C using the forming device 1 is the same as the procedure described in the previous embodiment. However, in this embodiment, the arrangement unit 5 is mainly moved.

The invention claimed is:

1. A tire manufacturing method, comprising:

sequentially arranging and bonding one band-like strip material comprising a plurality of reinforcing cords arranged in parallel with each other and coated with an unvulcanized rubber to a forming surface located on an outer circumferential side of a rigid core in a circumferential direction of the rigid core such that the reinforcing cords are extended in an oblique direction at a predetermined inclination angle with respect to the circumferential direction, thereby forming a belt layer in which the strip materials that are bonded adjacent to each other in the circumferential direction are bonded;

constructing a belt multilayer structure by layering a plurality of the belt layers in which the reinforcing cords of the belt layers vertically adjacent to each other have opposite inclination directions with respect to the circumferential direction;

forming a green tire having the belt multilayer structure; and vulcanizing the green tire, the method comprising:

when constructing the belt multilayer structure, forming each of the belt layers by repeatedly performing a step of holding in a vertically sandwiched manner, by a pair of gripping portions of one holding machine, the one strip material supplied through one strip material supply line, moving and placing the strip material into one arrangement unit, and bonding the strip material placed in the arrangement unit to the forming surface, in which the pair of gripping portions is vertically turned while the pair of gripping portions holding the strip material moves from the strip material supply line to the arrangement unit, thereby the strip material held by the pair of gripping portions is turned upside down and placed in the arrangement unit so that the inclination directions of the reinforcing cords of the belt layers vertically adjacent to each other are opposite to each other; wherein when the strip material is turned upside down, the strip material is turned about a parallel axis with respect to a longitudinal direction of the strip material in a state where the strip material is sandwiched and held between the pair of gripping portions from one end portion side in the longitudinal direction.

2. A tire manufacturing method, comprising:

sequentially arranging and bonding one band-like strip material comprising a plurality of reinforcing cords arranged in parallel with each other and coated with an unvulcanized rubber to a forming surface located on an outer circumferential side of a rigid core in a circumferential direction of the rigid core such that the reinforcing cords are extended in an oblique direction at a predetermined inclination angle with respect to the circumferential direction, thereby forming a belt layer in which the strip materials that are bonded adjacent to each other in the circumferential direction are bonded;

constructing a belt multilayer structure by layering a plurality of the belt layers in which the reinforcing cords of the belt layers vertically adjacent to each other have opposite inclination directions with respect to the circumferential direction;

forming a green tire having the belt multilayer structure; and vulcanizing the green tire, the method comprising:

when constructing the belt multilayer structure, forming each of the belt layers by repeatedly performing a step of holding in a vertically sandwiched manner, by a pair of gripping portions of one holding machine, the one strip material supplied through one strip material supply line, moving and placing the strip material into one arrangement unit, and bonding the strip material placed in the arrangement unit to the forming surface, in which the pair of gripping portions is vertically turned while the pair of gripping portions holding the strip material moves from the strip material supply line to the arrangement unit, thereby the strip material held by the pair of gripping portions is turned upside down and placed in the arrangement unit so that the inclination directions of the reinforcing cords of the belt layers vertically adjacent to each other are opposite to each other; wherein the strip material supply line has two conveying mechanisms which are disposed with a gap therebetween, the one strip material supplied straddles the gap so that the one strip material bridges over each of the conveying mechanisms, and the pair of gripping portions inserted between the gap vertically sandwich and hold the strip material.

* * * * *